US010729984B1

(12) United States Patent
Schindler et al.

(10) Patent No.: US 10,729,984 B1
(45) Date of Patent: *Aug. 4, 2020

(54) SYSTEMS AND METHODS FOR ENCRYPTION OF COMMUNICATIONS WITH VIDEO GAMES

(71) Applicant: Texta, Inc., Brooklyn, NY (US)

(72) Inventors: Oren Schindler, Brooklyn, NY (US); Kristen Nelson, Brooklyn, NY (US); Kris Fernando, Brooklyn, NY (US); Dana Deskiewicz, Brooklyn, NY (US)

(73) Assignee: Texta, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,838

(22) Filed: Jan. 7, 2019

Related U.S. Application Data

(63) Continuation of application No. 15/467,982, filed on Mar. 23, 2017, now Pat. No. 10,173,141, which is a
(Continued)

(51) Int. Cl.
*A63F 13/87* (2014.01)
*H04L 12/58* (2006.01)
(Continued)

(52) U.S. Cl.
CPC ............ *A63F 13/87* (2014.09); *A63F 13/35* (2014.09); *A63F 13/71* (2014.09); *H04L 51/046* (2013.01);
(Continued)

(58) Field of Classification Search
None
See application file for complete search history.

(56) References Cited

U.S. PATENT DOCUMENTS 9,299,064 B1  3/2016  Liu et al.
9,669,296 B1  6/2017  Hibbert et al.
(Continued)

OTHER PUBLICATIONS

U.S. Appl. No. 14/975,372, filed Dec. 18, 2015 Non-Final Office Action dated Jul. 7, 2017.
(Continued)

*Primary Examiner* — Jason T Yen
(74) *Attorney, Agent, or Firm* — Rutan & Tucker, LLP

(57) ABSTRACT

A system that may be utilized for sending and locking electronic communications is provided. The system allows a user to send an electronic communication that is locked, for example, encrypted, hidden, or otherwise made unviewable by the system to form a locked communication. The locked communication can be formed by associating a game with the electronic communication and requiring that a recipient play the game and satisfy an objective of the game before the electronic communication is "unlocked" or made viewable and displayed for the recipient. The locked communications can be sent to multiple recipients or to groups and can provide opportunities for competitive or cooperative play between users. Promotions, coupons, incentives, coupons, and marketing materials can be sent as locked messages and require or incentivize engagement by users.

20 Claims, 18 Drawing Sheets

Related U.S. Application Data continuation-in-part of application No. 14/975,372, filed on Dec. 18, 2015, now Pat. No. 9,895,616.

(60) Provisional application No. 62/435,711, filed on Dec. 16, 2016.

(51) Int. Cl.
| | |
|---|---|
| *H04W 4/60* | (2018.01) |
| *H04L 29/06* | (2006.01) |
| *A63F 13/71* | (2014.01) |
| *A63F 13/35* | (2014.01) |
| *H04M 3/42* | (2006.01) |
| *H04W 4/14* | (2009.01) |

(52) U.S. Cl.
CPC ........ *H04L 67/38* (2013.01); *H04M 3/42178* (2013.01); *H04W 4/14* (2013.01); *H04W 4/60* (2018.02); *H04L 51/043* (2013.01)

(56) References Cited

U.S. PATENT DOCUMENTS

| | | | |
|---|---|---|---|
| 9,895,616 B2 | 2/2018 | Schindler et al. | |
| 10,173,141 B1 | 1/2019 | Schindler et al. | |
| 2002/0147642 A1 | 10/2002 | Avallone et al. | |
| 2003/0216961 A1 | 11/2003 | Barry | |
| 2004/0015548 A1* | 1/2004 | Lee | H04L 12/1827 |
| | | | 709/204 |
| 2007/0024527 A1* | 2/2007 | Heikkinen | A63F 13/52 |
| | | | 345/9 |
| 2010/0020972 A1 | 1/2010 | Baugher et al. | |
| 2010/0317423 A1 | 12/2010 | Osborne | |
| 2012/0071235 A1 | 3/2012 | Walker et al. | |
| 2012/0244948 A1 | 9/2012 | Dhillon et al. | |
| 2013/0004932 A1* | 1/2013 | Mahajan | G09B 7/02 |
| | | | 434/362 |
| 2013/0017870 A1 | 1/2013 | Parker et al. | |
| 2013/0144702 A1 | 6/2013 | Tabor et al. | |
| 2014/0278638 A1 | 9/2014 | Kreuzkamp et al. | |
| 2015/0138099 A1 | 5/2015 | Major | |
| 2015/0142539 A1* | 5/2015 | Mueller | G06Q 30/0212 |
| | | | 705/14.14 |
| 2015/0336004 A1* | 11/2015 | Shimizu | A63F 13/58 |
| | | | 463/42 |
| 2016/0044034 A1 | 2/2016 | Spilman | |
| 2017/0173476 A1 | 6/2017 | Schindler et al. | |

OTHER PUBLICATIONS

U.S. Appl. No. 14/975,372, filed Dec. 18, 2015 Notice of Allowance dated Nov. 24, 2017.

U.S. Appl. No. 15/467,982, filed Mar. 23, 2017 Final Office Action dated Nov. 1, 2017.

U.S. Appl. No. 15/467,982, filed Mar. 23, 2017 Non-Final Office Action dated Jul. 7, 2017.

U.S. Appl. No. 15/467,982, filed Mar. 23, 2017 Notice of Allowance dated Aug. 13, 2018.

* cited by examiner

SYSTEMS AND METHODS FOR ENCRYPTION OF COMMUNICATIONS WITH VIDEO GAMES

CROSS-REFERENCE TO RELATED APPLICATIONS

This application is a continuation of U.S. patent application Ser. No. 15/467,982, filed Mar. 23, 2017, now U.S. Pat. No. 10,173,141, issued Jan. 8, 2019, which is a continuation-in-part of U.S. patent application Ser. No. 14/975,372, filed Dec. 18, 2015, and also claims the benefit of priority to U.S. Provisional Application No. 62/435,711, filed August Dec. 16, 2016, the entire contents of both are incorporated by reference herein.

BACKGROUND

Phones and other communication devices can be used for various forms of communication. As one example, phones or other communication devices may be used for text messaging or texting, i.e., a text message can be sent from one phone to another. Many people, especially younger generations, grow up with mobile phones and spend a significant amount of time communicating with others on their phones and using various applications. Social media has been popular, but identity fatigue and a shift from "broadcast" behavior of some social media sites is pushing people away from social media sites in search of more private and/or personal means of communicating and sending messages or information to each other.

Text messaging or texting may include composing and sending brief, electronic messages between two or more phones or other fixed or portable communication devices over a network (e.g., a telephone network). Messaging and/or text messaging may refer, for example, to using the Short Message Service (SMS) or sending messages containing image, video, and sound content (sometimes known as multimedia messaging service "MMS" messages). Text messaging or texting can involve use some or all 26 letters of the alphabet and 10 numerals, e.g., alpha-numeric messages. The sender of a text message is sometimes called a texter. A "text" or "text message" may refer to the message sent. Group messaging or group texting, which involves more than two people in a messaging exchange or conversation, can also be used. Messaging may be used for delivering digital content, such as pictures, videos, news, logos, ringtones, and/or financial information.

Text messages or texts can be used for a variety of purposes, e.g., for communication, for entertainment, to share photographs or other media, for interaction with automated systems (for example, to order products or services, or to participate in contests), for marketing/advertising (for example, to notify users about promotions, coupons, deadlines, etc.). Text messaging can be used as a substitute for voice calls in situations where voice communication is impossible or undesirable. Some text messages (e.g., SMS) can also be used for the remote controlling of other devices (e.g., appliances). A Flash SMS can appears directly on the main screen of a phone or device without user interaction and may not be automatically stored in the inbox, and can be used in cases of emergency (e.g. fire alarm) or confidentiality (e.g. one-time password). Text-service websites may allow registered users to receive text messages when new items become available and/or when items go on sale.

Text messages/texts, or other messages can be sent in a variety of ways. For example, once a message is typed, it can travel through radio waves to a control channel. The control channel is a pathway that allows communication between a phone and cell phone tower, including sending and receiving calls, data packets, messages, etc. A short message service center (SMSC) or other service center may be a section of a wireless service that can store, forward, and receives data and messages. A message may travel through a control channel and arrive at an SMSC or other service center to be stored and/or sent to a recipient's phone. The SMSC or other service center can store messages when they cannot be delivered (e.g., if the recipient's cell phone is off).

As another example, data can travel from a phone or other communication device to a phone tower or antenna (e.g., a 4G LTE antenna on top of a cellular site). The cellular site may process the data, then send it over a telecomm fiber optic cable to a Mobile Switching Center ("MSC"). The MSC can process the data and send it (e.g., via fiber optic) to the carrier's IMS Core, where more data processing can happen and where an app to handle the data may be selected. The data can then be sent from the MSC to a cellular site, then to the antenna, and finally to the receiving phone or communication device.

Gateway providers (e.g., SMS gateway providers) can be used to facilitate messaging traffic between businesses and subscribers or device users. Gateway providers may be responsible for carrying various messages (e.g., mission critical messages), enterprise communications, content delivery, entertainment services, etc. Gateway providers can provide gateway-to-mobile (Mobile Terminated—MT) services and/or supply mobile-to-gateway (text-in or Mobile Originated/MO services). Some may operate text-in services on shortcodes or mobile number ranges, and others may use lower-cost geographic text-in numbers.

There is still room for text messaging and other communication to evolve, improve, do new things, reach more people, and allow interaction and communication in new ways, e.g., to form new types of messages and messaging. There is a need for improving messaging and ways of communicating between phones and mobile communication devices. Further, standard text messages or texts are not locked or encrypted and may be read immediately upon receipt by the recipient. However, in some instances, it may be beneficial or desirable to hide, lock, or encrypt a message to prevent viewing before the message is unlocked or steps have been taken to view the message. This can be for added security, for timing reasons, for challenges, for contests, for entertainment, for other reasons, or for a combination of these or other reasons. Locking or hiding a message until a game, puzzle, or some form of entertainment is completed may be a fun new way to interact and communicate with other people. For example, a game might be utilized to add entertainment, education, enjoyment, pleasure, spontaneity, exercise, recreation, education, leisure activities, contexts, and more. Games might also be used as artistic expressions. A computer game and/or video game may be an electronic or microprocessor controlled game. Computers and/or other electronic media can create virtual tools that may be utilized to play the game. Computer and/or video games may utilize one or more input devices, such as a button, a combination of buttons, remote or joystick, touchscreen, etc. Additionally, computer and/or video games may utilize a keyboard, a mouse, a trackball, touchscreen, controller or any other motion sensitive tool. There is a need for better gaming platforms, e.g., that do not require downloading the games. There is a need for a mobile engagement platform that seamlessly intertwines messaging and gaming in a single experience, and that can also intertwine brand interaction.

Various systems, devices/apparatuses, methods, etc. are described herein that provide messaging and other communication services and combine them with games to address the needs, issues, and goals discussed above and other needs and goals described herein.

SUMMARY

The present invention relates to systems and methods associated with gaming and messaging platforms that provide the ability to communicate among two or more electronic devices. More specifically, the gaming and messaging platforms may be utilized for transmitting communications secured using a game or entertainment method between two or more electronic devices such that the communication may be displayed graphically following completion of the game or entertainment method.

In one embodiment, a system for electronic communication between two or more people or users of the system may be provided and/or used. The system may be used in various methods of communication and interaction, and/or to facilitate communication and interaction, between two or more people or users of the system. The system may be used in methods of entertainment, competition, challenge, communication, interaction, betting, security, job interviews, education, and more.

The system may include logic, a database, application programming interface (API), memory, various computing devices, processors, communication devices (e.g., mobile communication devices like mobile/smart phones, tablets, phablets, etc.), stored instructions, or one or more combinations of these. Two or more components of the system may exchange data using at least one of a cellular network, wireless network, a cable network, a telephony network, and a solid phase data carrier. The system may include code or instructions downloaded to a mobile communication device (e.g., a mobile/smart phone; laptop; tablet; phablet, etc.). The code or instructions may be programmed to be executed as an independent application or an applet on the mobile communication device. In one embodiment, the electronic game can be played on the mobile communication device to unlock the message without requiring the electronic game to be downloaded to the mobile communication device.

The logic and/or stored instructions of the system may be executable by one or more processors to perform any of the functions and operations described in this application or similar thereto, including responsive to receiving input that a user has created an electronic message (e.g., a text message, media message, group message, game message, etc.) and has selected an, electronic game (e.g., a video game) for locking the electronic message, generating a locked message (e.g., a message that is hidden, encrypted, or otherwise prevented from being opened and viewed until it is "unlocked" or made allowed or available to be viewed) using system logic executed by the one or more processors and routing the locked message to a mobile communication device, wherein the locked message is generated such that the game must be played and a game objective achieved before the locked message can be displayed on the mobile communication device.

The system may comprise additional stored instructions, etc. that, when executed by one or more processors, perform further operations, for example: responsive to receiving input that the game objective is a customized game objective identified by the user in the user interface, generating the locked message so that the electronic game must be played and the customized game objective achieved before the locked message can be displayed on the mobile communication device; determining points earned by the user based on input received as a result of certain predetermined activities using the system, and, displaying the points earned by the user on a screen; determining points earned by multiple users based on input received as a result of certain predetermined activities using the system, and displaying the points earned by the user and the multiple users on a screen; determining a high-point user that has the highest number of points of the multiple users and the user (or determining a group of high-point earners or otherwise selecting persons/users based on points or other information); generating a locked award message including at least one of a Quick Response (QR) code, barcode, and a unique identification code that can be used to obtain a discount or award (e.g., a promotion, coupon, prize, etc.), wherein the locked award message is generated such that the high-point user (or group of high-point earners or otherwise selected persons/users) must play a game to unlock the locked award message; and sending the locked award message to the high-point user (or group of high-point earners or otherwise selected persons/users).

The system may comprise additional stored instructions, etc. that, when executed by one or more processors, perform further operations, for example: providing tools for generation of a customized game that may be used to generate the locked message, receiving input that the customized game has been generated, wherein the electronic game for locking the message is the customized game; responsive to receiving input that the game objective is a customized game objective identified by a user in the user interface, generating the locked message such that the electronic game must be played and the customized game objective achieved before the locked message can be displayed on the mobile communication device; displaying various links to different screens, wherein if the system receives input that a link has been selected, the system automatically generates and displays a new screen that corresponds to the link; generating and displaying a newsfeed including status updates posted by the user's contacts; generating and displaying an alert that indicates one or more of a new activity, a new message, a new update, and a new game, and generating a game menu showing multiple games that can be selected for locking the electronic message.

The system may comprise additional stored instructions, etc. that, when executed by one or more processors, perform further operations, for example: obtaining data regarding conversations of the user from a database and displaying the conversations to the user; responsive to receiving input that a user has created an electronic message, routing the electronic message to a mobile communication device, wherein the electronic message is one or more of a text message, media message, group message, and game message; displaying a locked message indicator on the mobile communication device to indicate receipt of the locked message; responsive to receiving input that the locked message indicator has been selected, launching the electronic game for playing on the mobile communication device; and responsive to receiving input that the game objective has been achieved, displaying the electronic message on the mobile communication device.

The system may receive input/data indicating that the user has created the electronic message and has selected the electronic game for locking the message, and the system may generate or include instructions to generate the locked message upon receiving input that a send, button or send link has been selected by the user. Further, generating the locked message may comprise generating data associated with the electronic message indicating that the electronic message should not be displayed on the mobile communication device. The system may comprise additional stored instructions, etc. that, when executed by one or more processors, and in response to receiving input that the electronic game has been played and the game objective achieved, deleting or changing the data associated with the electronic message such that the electronic message may be displayed on the mobile communication device. Optionally, generating the locked message may comprise encrypting the electronic message using a hash and salt or another type of encryption such that the electronic message cannot be displayed on the mobile communication device until the encryption is removed by playing the electronic game and achieving the game objective.

The system may comprise additional stored instructions, etc. that, when executed by one or more processors, perform further operations, for example: responsive to determining that multiple recipients have been selected, routing the locked message to multiple mobile communication devices; providing a user an option to challenge other users in a game and bet points earned by the user, such that a winner of the challenge is awarded the points, and gathering information regarding the user and, based on the information, generating a personalized locked message including a promotion or discount that may be accessed by the user after unlocking the personalized locked message. The information may include information regarding the user's location, and generating the personalized locked message may include generating the personalized locked message such that it includes a promotion or discount for use near the user's location, wherein the promotion or discount may be accessed by the user after unlocking the personalized, locked message.

In one embodiment, a method of facilitating communication between two or more users and playing an electronic amusement system, may comprise: providing a system including logic and/or stored instructions executable by one or more processors to perform functions and operations. The method may include having the system acquire from the user a first set of data and/or parameters using a user interface that is displayed on a screen or monitor; displaying a graphic representation of the first set of data and/or parameters to the user; allow the user to lock a communication (e.g., an electronic message) with an electronic game (e.g., a video game) such that the communication cannot be read by a recipient until the recipient completes/beats the video game; and route or send the encrypted communication to the recipient or multiple recipients. The method may also comprise providing an electronic amusement system or platform wherein the electronic amusement system or platform allows for graphical representation of a user input. The electronic amusement system may allow for the user to customize parameters or aspects of the electronic game. The system may allow a user to customize or build his own electronic game and then use the electronic game to form a locked message, and send the locked message to a friend or contact. The electronic game(s) may be customizable. The method may involve providing an electronic game that may allow the user to share their game with other users. The electronic game may allow for multiple users to utilize the same game.

In one embodiment, a non-transitory storage medium having stored thereon instructions may be provided (and/or may be used in any of the methods herein). The instructions may be executable by one or more processors to perform operations similar to and/or including any of the operations or functions described in this application. For example, the instructions may be executable by one or more processors to perform operations similar to and/or including receiving a first input from a first computing device, the first input including data for an electronic message and an indication the electronic message is to be locked with an electronic game; generating the electronic message including the data and locking the electronic message with the electronic game, and transmitting the locked electronic message to a second computing device. The instructions may also be executable by the one or more processors to perform operations further including: receiving a second input from the second computing device, the second input including an indication of a required score or level of the electronic was reached via a third input received by the second computing device. In one embodiment, the instructions may be executable by the one or more processors to perform operations further including generating a second electronic message including the data, and transmitting the second electronic message to the second computing device, wherein the second electronic message is not locked by the electronic game.

The systems and methods described herein may provide a proprietary, linked, text messaging and mobile game discovery platform They may also develop a robust user base for interactive targeted deals and coupons, providing both entertainment and value to the user. The systems, game platforms, methods, etc. described herein provide an exciting, fun, novel, and rewarding experience to users. In one embodiment, the systems and game platforms may onboard users from other messaging platforms by interfacing and/or providing rewards, prizes, etc. The system and game platform may also enable users to create leagues, accrue points with the ability to win prizes and badges within their social and personal networks. The system and game platform may enable sampling exclusive mobile games without the need to download them.

Various objects, features, aspects and advantages of the present invention will become more apparent from the following detailed description of preferred embodiments of the invention, along with the accompanying drawings in which like numerals represent like components. Further, additional features and advantages of the present invention are described herein, and will be apparent from the detailed description of the presently preferred embodiments and from the drawings.

BRIEF DESCRIPTION OF THE DRAWINGS

The disclosed devices/apparatuses, systems and methods can be better understood with reference to the following drawings. The components in the drawings are not necessarily to scale.

Figure 1:
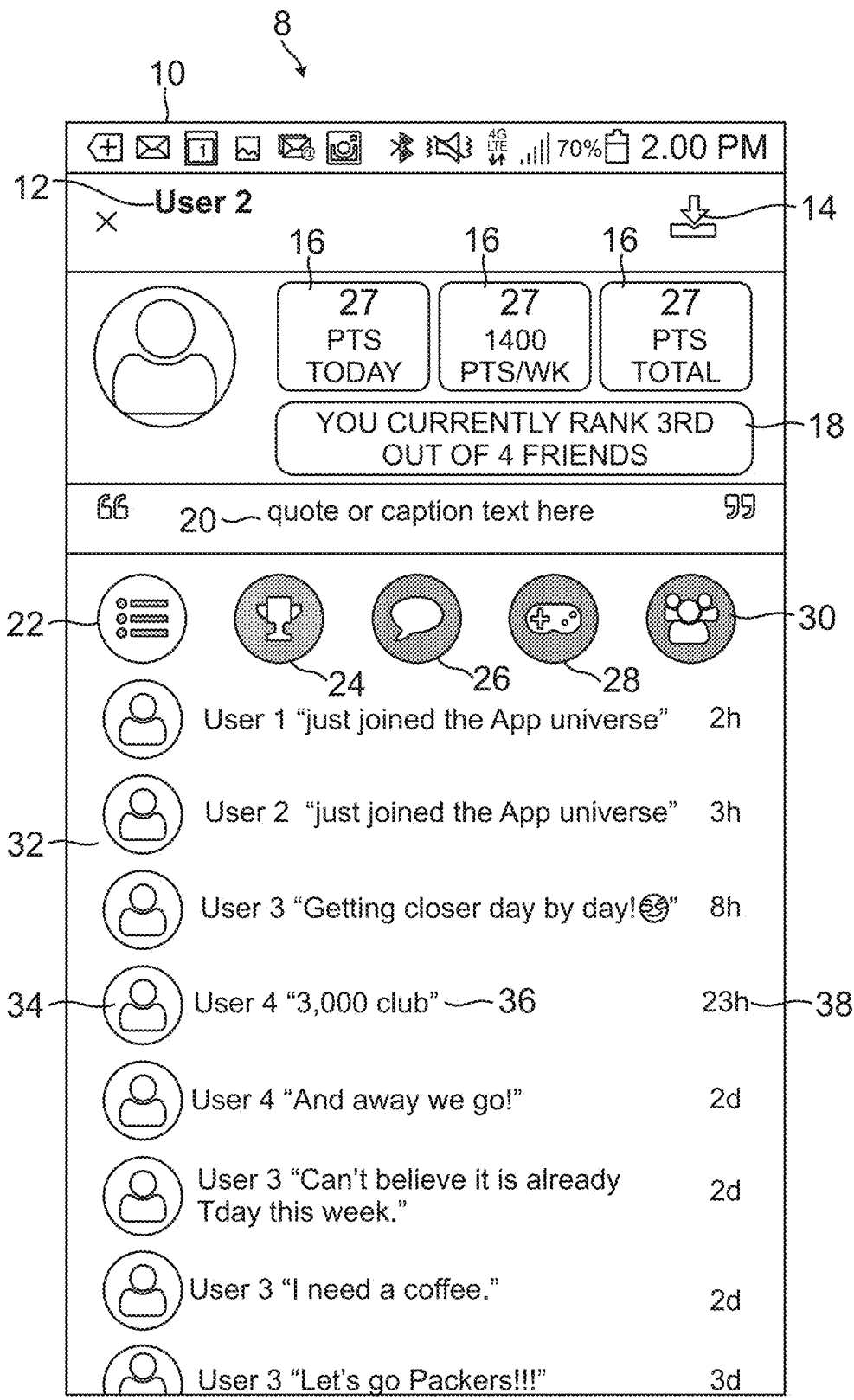
FIG. 1 shows a screenshot from an exemplary communication device or phone operating an exemplary application that may be used as part of the invention, the screenshot showing a newsfeed.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The following description and accompanying figures, which describe and show certain embodiments, are made to demonstrate, in a non-limiting manner, several possible configurations of systems, platforms, devices, methods, etc. that may be used for sending and receiving messages, locking or encrypting messages, using electronic games to encrypt messages, and/or for playing electronic or video games according to various aspects and features of the present disclosure.

Various systems, devices/apparatuses, and methods are described herein, including systems, platforms, devices, methods, etc. that may be used for sending and receiving messages, hiding, locking, or encrypting the messages using electronic games that must be completed to open the messages, and/or for playing electronic/video games. While specific embodiments are discussed herein by way of example, the embodiments and examples described are not intended to be limiting. The inventive principles associated with the embodiments described herein, including with respect to the units, systems, devices, phones, apparatuses, applications, messages, methods, etc., described herein, may be applied to a variety of different types of uses, systems, apparatuses, units, applications, messages, methods, etc.

In the following description, certain terminology is used to describe features of the invention. For example, in certain situations, the term "logic" may be representative of hardware, firmware and/or software that is configured to perform one or more functions. As hardware, logic may include circuitry having data processing or storage functionality Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface ("API"), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory, non-persistent storage such as volatile memory (e.g., any type of random access memory "RAM"), persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

FIG. 1 shows an exemplary screenshot 8 from an exemplary communication device or phone operating exemplary logic (e.g., an application ("app")) that may be used as part of the systems or platforms described herein. The communication device (e.g., a mobile phone/smart phone) may, optionally, include some type of notification bar 10 that can be displayed on the screen and that notifies a user of messages, events, application updates, email, sound, volume, cellular service, cellular coverage, cellular strength, W'i-Fi, Bluetooth, battery remaining, time, etc. The communication device may be any type of communication device with a screen and connection through which communications/messages may pass (e.g., a physical connection such as a Lightning connector, a Universal Serial Bus (USB) connector, etc. or a wireless or cellular communication interface). For example, the communication device may be a phone, mobile phone, smart phone, computer, laptop, tablet, phablet, virtual reality device, gaming system (Microsoft® Xbox®, Sony® PlayStation®, etc.) or other computing device, etc. The communication device may have buttons and/or keys. The screen or monitor associated with the communication device may be a touchscreen, or a screen or monitor without touch control capability.

Additionally, the logic may include software that is downloaded to the communication device and/or is accessible through the communication device. The logic used, whether on the communication device or in a remote location or both, may be configured to generate and/or display screenshot 8 (and other screenshots described herein) on a screen/display of the communication device and perform the functions described herein. The logic may operate in combination with hardware of the communication device, external hardware, remote hardware, memory, processors, servers, routers, screens/displays, cellular equipment, and any other hardware or equipment useful to implement the system, software, and/or invention. The system may be configured to use the same internet data plan that a user uses for email and web browsing, so there may be no additional cost to message and use the system or app. The system may store messages and other information associated with a user, such that a user could log-in (e.g., with their telephone number) to the app from different devices/phones and locations, and the system would be able to access the user's messages and friends as stored (e.g., on a database) and generate and display copies of the information on the different devices/phones.

The screenshot 8 in FIG. 1 shows an exemplary homepage or newsfeed page of an application that may be used to implement or facilitate one or more features described herein. The homepage or newsfeed page may include a user identifier or name 12, an update or download indicator 14, point/score trackers 16, a rank indicator 18, a dialog or input box 20, a home link 22, a points/awards link 24, a conversation or messaging link 26, a game link 28, a relationship/friend link 30, and a newsfeed 32. The system or a user's phone may display links 22, 24, 26, 28, and 30 on some or all of other screens displayed to provide a user with an easy way of navigating to a desired location, e.g., these links are shown in one or more of the screenshots in FIGS. 1-17. If the system receives input that a link has been selected, the system may automatically generate and/or display a new screen that corresponds to the link. When the system receives input that a link has been selected, it may display the link as highlighted or otherwise distinguished from other links to show it has been selected.

Figure 2:
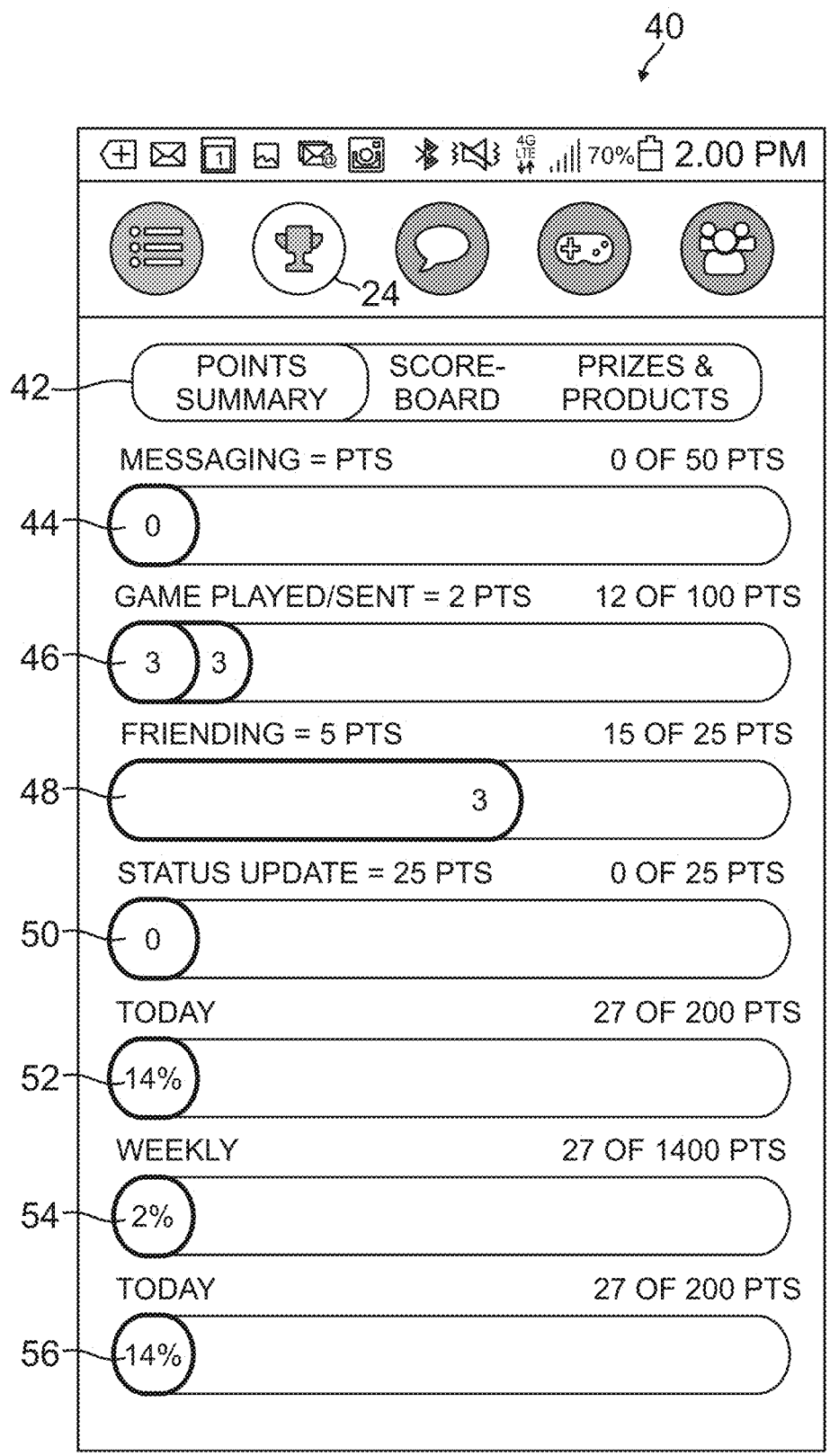
FIG. 2 shows a screenshot from an exemplary communication device or phone operating an exemplary application that may be used as part of the invention, the screenshot showing an exemplary points/awards screen.

For example, in FIG. 2, the points/awards link 24 is shown as having its colors inverted relative to the other links (e.g., the other links show a white interior depiction and a shaded background, but the selected link is shown as having a shaded interior depiction and a white background). This or some other type of highlighting can be done with each of the links when they are selected. In other embodiments, the links 24, 26, 28 and 30 as seen in FIGS. 2-5, 7-9, 11 and 14-17 may appear at other locations in the user interface (e.g., at the bottom of the display screen of the electronic device or phone).

Figure 11:
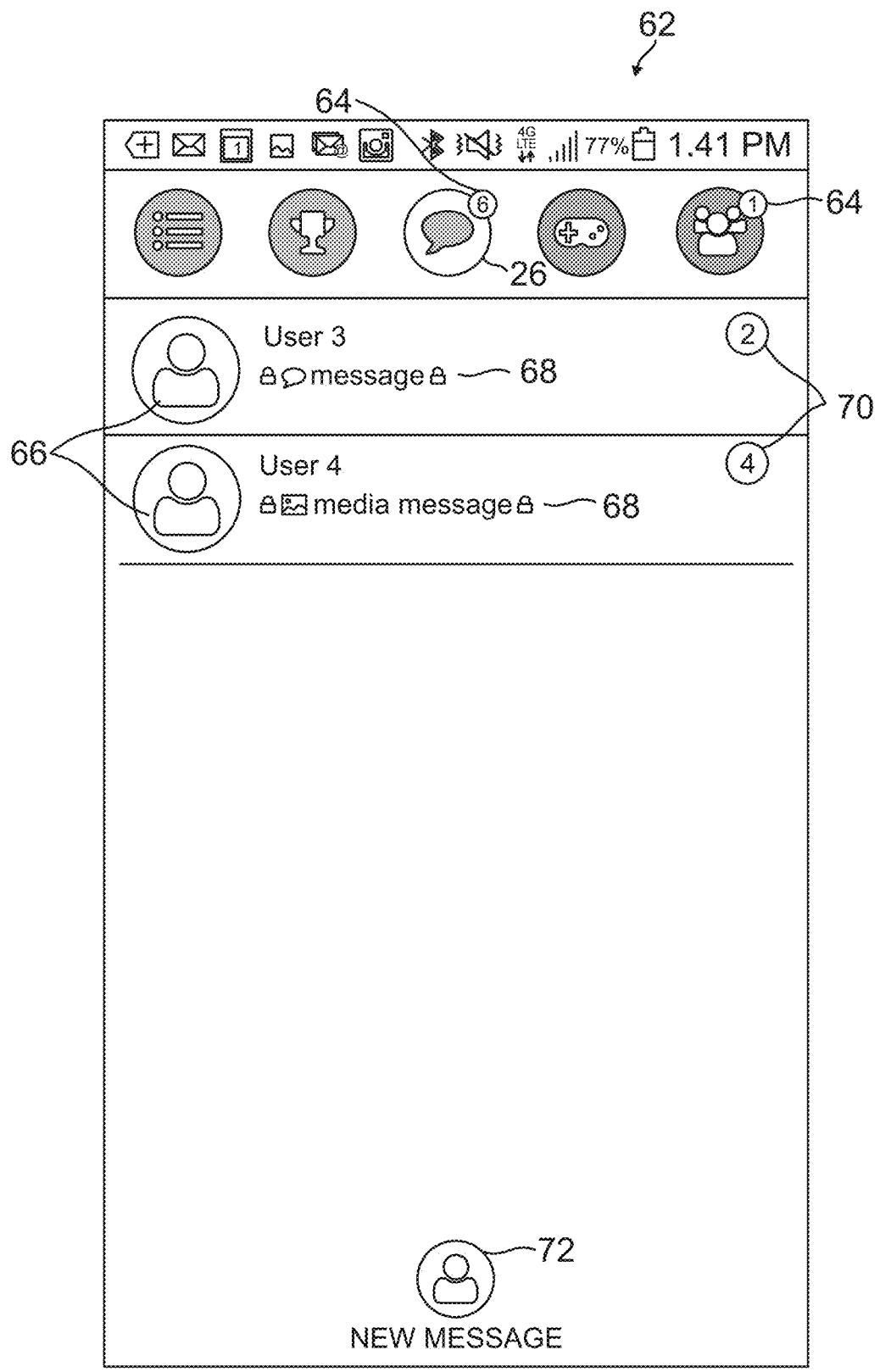
FIG. 11 shows a screenshot from an exemplary communication device or phone operating an exemplary application that may be used as part of the invention, the screenshot showing an exemplary conversation or messaging screen.

The system may generate and display alerts or new activity indicators 64 (e.g. notification bubbles as shown in FIG. 11) that indicate new activity, messages, updates, games, information, etc. in one or more of the links. For example, the system may generate and display an alert or new activity indicator 64 associated with the home link 22 when new status updates are posted. Additionally, or in the alternative, the system may generate and display (i) an alert or new activity indicator 64 associated with the points/awards link 24 when new high scores are achieved or new points are earned, (ii) an alert or new activity indicator 64 associated with the conversation or messaging link 26 when new messages are received from another user (e.g., a contact or friend), (iii) an alert or new activity indicator 64 associated with the game link 28 when new games are available or new high scores are achieved by someone, and/or (iv) an alert or new activity indicator 64 associated with the relationship/friend link 30 when new friend/contact requests have been made or accepted. An alert or new activity indicator 64 may also be generated and displayed by the system to indicate other updates or information.

The user identifier or name 12 may be an actual name, user name, alphanumeric text, image, symbol, other type of identifier, or a combination of two or more of these. In one embodiment, the user identifier or name 12 may be used and displayed to identify and/or describe the user. The user identifier or name 12 may be the name of the user accessing the logic, system, app, and/or using the communication device. The user identifier or name 12 may appear in various locations on the screen. The user identifier 12 may include a profile picture, image, or avatar, e.g., as displayed just below the name to the left of trackers 16 in FIG. 1.

Referring still to FIG. 1, the update or download indicator 14 may provide a visual (e.g., graphical or textual) indication that a software update or other download is available. The communication device, app, or system may cause the software update or other download to download and/or update in response to receiving input that a user has selected (e.g., by tapping, clicking, etc.) the update or download indicator 14.

One or more point/score tracker(s) 16 may be used. The point/score tracker(s) 16 may be used to keep track of points earned by one or more users. The point/score tracker(s) 16 may track points earned over different time periods, e.g., a first box may track points earned that day, a second box may track points earned that week, and a third box may track total points earned, as shown in FIG. 1. The point/score tracker(s) 16 may also track other information, e.g., a box may be provided to track points earned on playing games and/or the most recent game played and another box may be provided to track other points earned from using the system or app. In one embodiment trophies, prizes, medals, badges, or other awards may be earned over time and the point/score tracker(s) 16 may be used to track these.

A rank indicator 18 may also be provided. The rank indicator 18 may indicate how a user ranks in relation to the user's friends on points, awards, trophies, prizes, medals, badges, and/or one or more other criteria. In one embodiment, the system may provide options for creating leagues and/or teams of people/users that use the system for various purposes, including competition. In one embodiment, the system can onboard users from other platforms or applications by rewarding them for messaging and sending games and/or locked messages.

A dialog or input box 20 may be provided that allows a user to input information. In one embodiment the dialog or input box 20 allows a user to provide a status update that will be shown in the newsfeed 32. The status update or other input may comprise words, numbers, images, video, links, other media, or any combination of these. The system may receive the status update or other input as entered in the dialog or input box 20, then automatically display the status update or other input in the newsfeed 32.

Newsfeed 32 may include status updates, images, videos, and other information posted by any of the user's friends or contacts and/or posted by the user in the dialog or input box 20. Newsfeed 32 could be configured to display only the status updates or other information, images, videos, etc. posted by anyone using the system or may be limited to only a user's friends or contacts Optionally, the user may customize the newsfeed to selectively hide or allow status updates from different people, friends, contacts, etc. The newsfeed 32 (as well as other screens showing friends/contacts) may include a profile picture, image, icon, or avatar 34 associated with each user to give a visual indication of the user, may include status updates 36 of various users/friends/contacts, may list the name or user name of the users/friends/contacts, and may list an indicator 38 of the time when the status update was posted (e.g., show how long it has been since the status update was posted as in FIG. 1, show a date of posting, or other time information). The system may provide options for uploading new profile pictures, image, icon, or avatar 34 associated with each user.

A home link 22 may be provided. When the system receives input that the home link 22 has been selected, the system may process the information and display the home screen, e.g. as shown in screenshot 8. The home screen may include newsfeed 32 and other information as shown in FIG. 1. The home screen may also or alternatively include other information as well, e.g., profile information, a calendar, statistics, links, scores, and/or other information.

A points/awards link 24 may also be provided. When the system receives input that the points/awards link 24 has been selected, the system may process the information and display a points/awards screen, e.g. as shown in screenshots 40 and 58 in FIGS. 2 and 3. FIG. 2 shows an exemplary screenshot 40 of an exemplary points/awards screen. When the system receives input that the points/awards link 24 has been selected, it may also display the points/awards link 24 as highlighted or otherwise distinguished from other links. For example, in FIG. 2, the points/awards link 24 is shown as having its shading or colors inverted relative to the other links (e.g., the other links show a white interior depiction and a shaded background, but the selected link is shown as having a shaded interior depiction and a white background). This or some other highlighting can be done with each of the links when they are selected Screenshot 40 also shows a sliding bar 42 and various point/award trackers 44. The sliding bar 42 may allow for switching between different screens, e.g., between screenshot 40 and 58 or between a points summary and a scoreboard. Other ways of switching between different screens are also possible, e.g., different tabs, links, etc.

Various point/award trackers 44 may be generated by the system, used, and displayed. For example, FIG. 2 in order from top to bottom shows point trackers for points earned for "Messaging" (e.g., sending a message and/or a locked message), "Game Played/Sent" (e.g., for completing a game sent to you by another person or sending a game to another person to play), "Friending" (e.g., adding new friends or contacts), "Status Update" (e.g., entering a new status update in the dialog or input box 20 on the home screen), "Today" (e.g., points earned that day), "Weekly" (e.g., points earned that week), and "Total" (e.g., total points earned). Other categories/trackers are also possible, e.g., categories/trackers for awards, prizes, trophies, medals, badges, yearly points, earning points in other categories, high scores on individual or combinations of games, etc. The trackers 44 can take a variety of shapes, colors, styles, etc. In one embodiment, the trackers 44 function similar to bar graphs that give visual and numerical indication of the category (e.g., points earned). Different points can be awarded/earned for different activities, e.g., 1-100 points for each message sent (e.g., 1 point), 1-100 points for each game played or sent to another person (e.g., 2 points), 1-100 points for each friend added (e.g., 5 points), 1-100 points for each status update (e.g., 25 points), and/or other amounts of points for these or other actions/events, etc. The built-in point system can directly link points to messaging (e.g., SMS/text sent), status updates, friending/making new contacts, games sent and received, and more. It should be noted that other numerical ranges may be used and the disclosure is not intended to be limited by those recited herein as examples.

Figure 3:
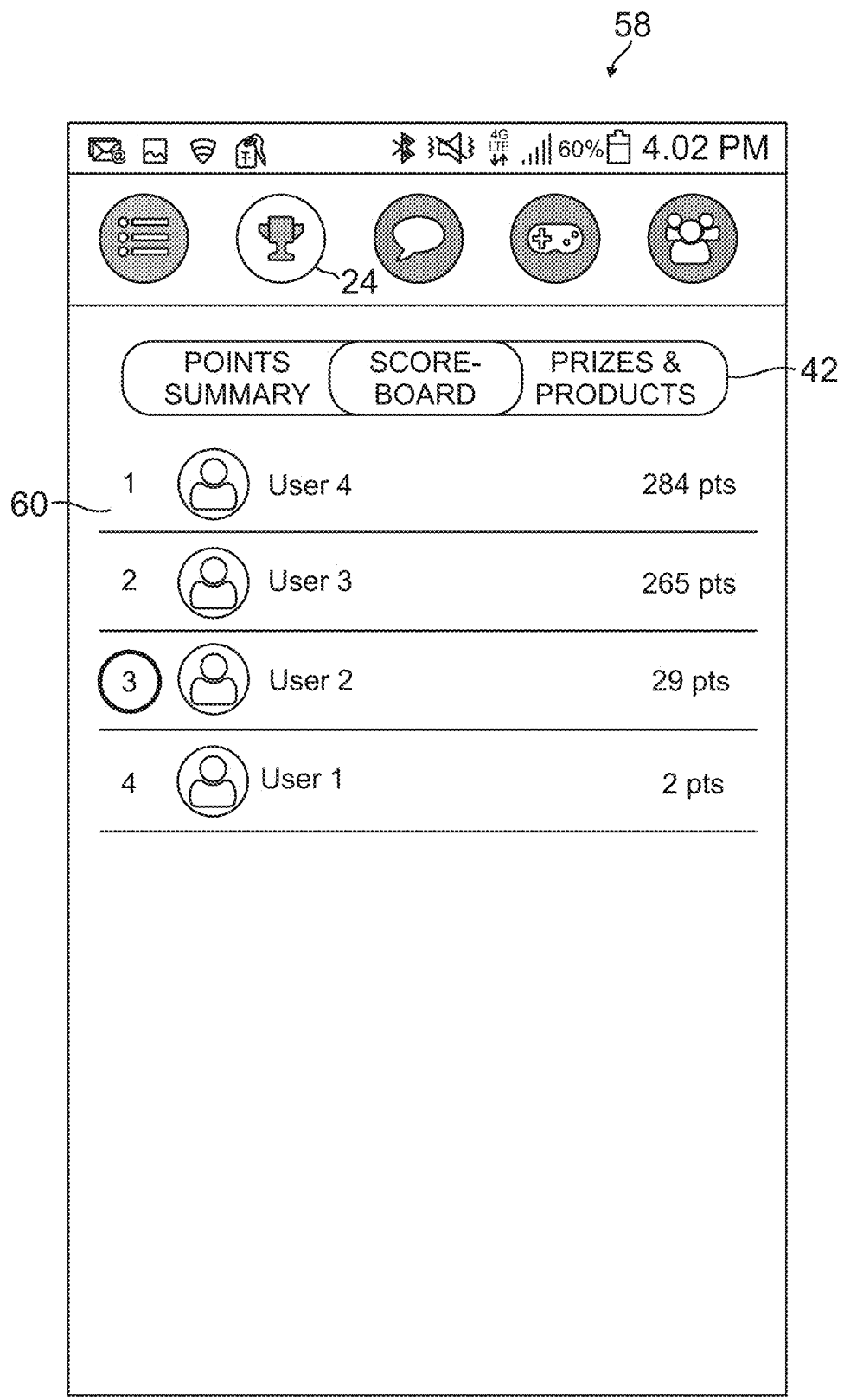
FIG. 3 shows a screenshot from an exemplary communication device or phone operating an exemplary application that may be used as part of the invention, the screenshot showing an exemplary points/awards scoreboard.

FIG. 3 shows an exemplary screenshot 58 that can represent another screen possible related to points and awards or link 24. Screen shot 58 shows tab or sliding bar 42 set to "scoreboard." The sliding bar 42 may include a plurality of selectable positions representing, for example, a Points Summary, a Scoreboard and Prizes & Products. A scoreboard 60 is shown in which multiple users are ranked according to how many points they have accumulated highest to lowest. The scoreboard 60 shown in FIG. 3 shows the points accumulated during the current week among one group of contacts/friends, so the scoreboard 60 provides rankings for that group during the current week. However, scoreboard 60 could provide different scores and rankings for the same or different groups of people. Further, multiple scoreboards 60 could be provided (e.g., as different windows, tabs, points along the sliding bar 42, etc.) that each track different types of points, awards, rankings, and/or other information. For example, some scoreboards may track high scores on different games, some may track high scores for different types of activities, etc.

In one embodiment, users with the highest scores or the top 5, 10, 15, 20, 30, 100, or other number of top scores may be eligible for additional prizes, promotions, options, deals, discounts, etc. Rewards may include daily, weekly, monthly, yearly, holiday, or other special prizes/rewards from sponsored brands (e.g., discounts, promotions, coupons, gift cards, tangible prizes (maybe an Oculus® Rift® headset, Beats® headphones, or other prizes)) In one embodiment, upon winning, a deal, reward, promotion, etc. may be generated by the system and provided to the user in the form of a Quick Response ("QR") code, barcode or unique alphanumeric promo identification ("ID") code that can be entered into a website to redeem. The system or platform may store and manage deals, rewards, promotions, etc. in a digital store within the system, platform, or app for users to browse, explore and ultimately redeem online or in store. The system or gaming platform may provide unique opportunities for users, friends/contacts to compete with each other and with the greater network (or all users).

A conversation or messaging link 26 may also be provided. When the system receives input that the conversation or messaging link 24 has been selected, the system may process the information and display a conversation or messaging screen, e.g. as shown in screenshot 62 in FIG. 11, as discussed in detail below. The conversation or messaging screen may show conversations or other exchanges between the user and his/her contacts, friends, and/or other people. The user is shown as having two ongoing conversations (e.g., messaging conversations) with friends 66. More conversations may be shown, and if the number of conversations exceeds the space available on the screen, the user may scroll down or up to see additional conversations/exchanges. The screen may also show a message summary 68 of what is the most recent message received or sent in that messaging conversation. Summary or indication 68 in FIG. 11 shows that the last message received from the first friend is a locked alphanumeric text message, and that the last message received from the second friend is a locked media text message (e.g., an image, video, sound clip, etc.) The messages are locked with electronic/video games that are played to open the messages as discussed in more detail below.

In one embodiment, a Brand advertising segment and/or User prize opportunity segment may be provided. In summation, this segment may be built into the tabbed user interface within the trophy/points section of the mobile application. Users on, the platform may receive points for doing various actions, e.g., messaging, playing games, completing games, sending games, updating status, adding friends, etc. The points can be used to gamify the messaging and gaming experiences as well as create playful competition among friends via the scoreboard. Beyond those features, users may also be able to also qualify daily and weekly (and/or over other periods of time) to be entered into a raffle for opportunities to win prizes as products & experiences on behalf of brands globally.

Brand advertising segment and/or User prize opportunity segment may offer a variety of different brands/prizes/products (e.g., 1-15 different brands/prizes/products) each day (or over another time period) In one embodiment, three different brands may be offered each day for a minimum of one week each in the prize of the day (hereinafter referred to as "POD") segment. Usually the brands in those segments will have a variety of products or experiences that will differ daily but not necessarily. With the prize of the week (hereinafter referred to as "POW") segment, a brand may have an opportunity to showcase one product or experience that is generally a larger ticket item. Experiences may include meeting a celebrity (e.g., backstage passes at a concert, meal with a celebrity, etc.), vacation packages, travel, etc. Smaller experiences may be offered through the POD segment (or POW segment) as well, e.g., dinner out for two. The value may be used to determine what is categorized as a POD and what is categorized as a POW or other prize offerings.

Figure 4:
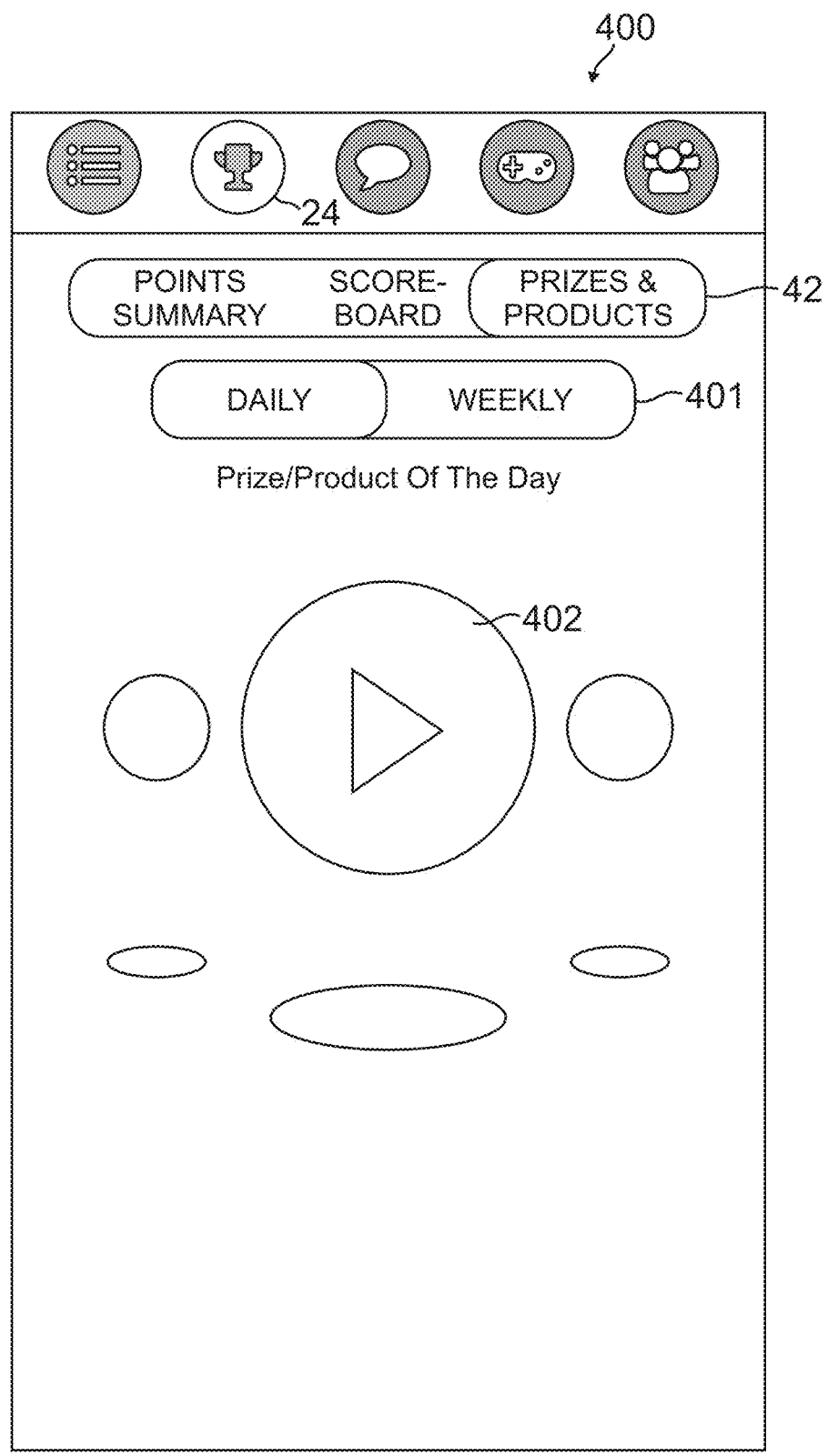
FIG. 4 shows a screenshot from an exemplary communication device or phone operating an, exemplary application that may be used as part of the invention, the screenshot showing an exemplary animated carousel illustrating one or more brands.

Referring now to FIG. 4, a screenshot from an exemplary communication device or phone operating an exemplary application that may be used as part of the invention, the screenshot showing an exemplary animated carousel illustrating one or more brands is shown. In one embodiment, the screenshot 400 illustrates a POD screen when a "Prizes & Products" tab is selected from the sliding bar 42. When the tab registers that a user has tapped it or provided input, the system may automatically fall or transition to the POD screen. In one embodiment, when the POD screen is first displayed (or at other times) a 10-15 second animation 402 may "carousel" or rotate various brands (shown in FIG. 4 as circles having of the icons shadows underneath, but could be other icons, logos, trademarks, prize images, or other images, etc.) featured as a daily or weekly prize. It has also been contemplated that other animations could be used.

Figure 5:
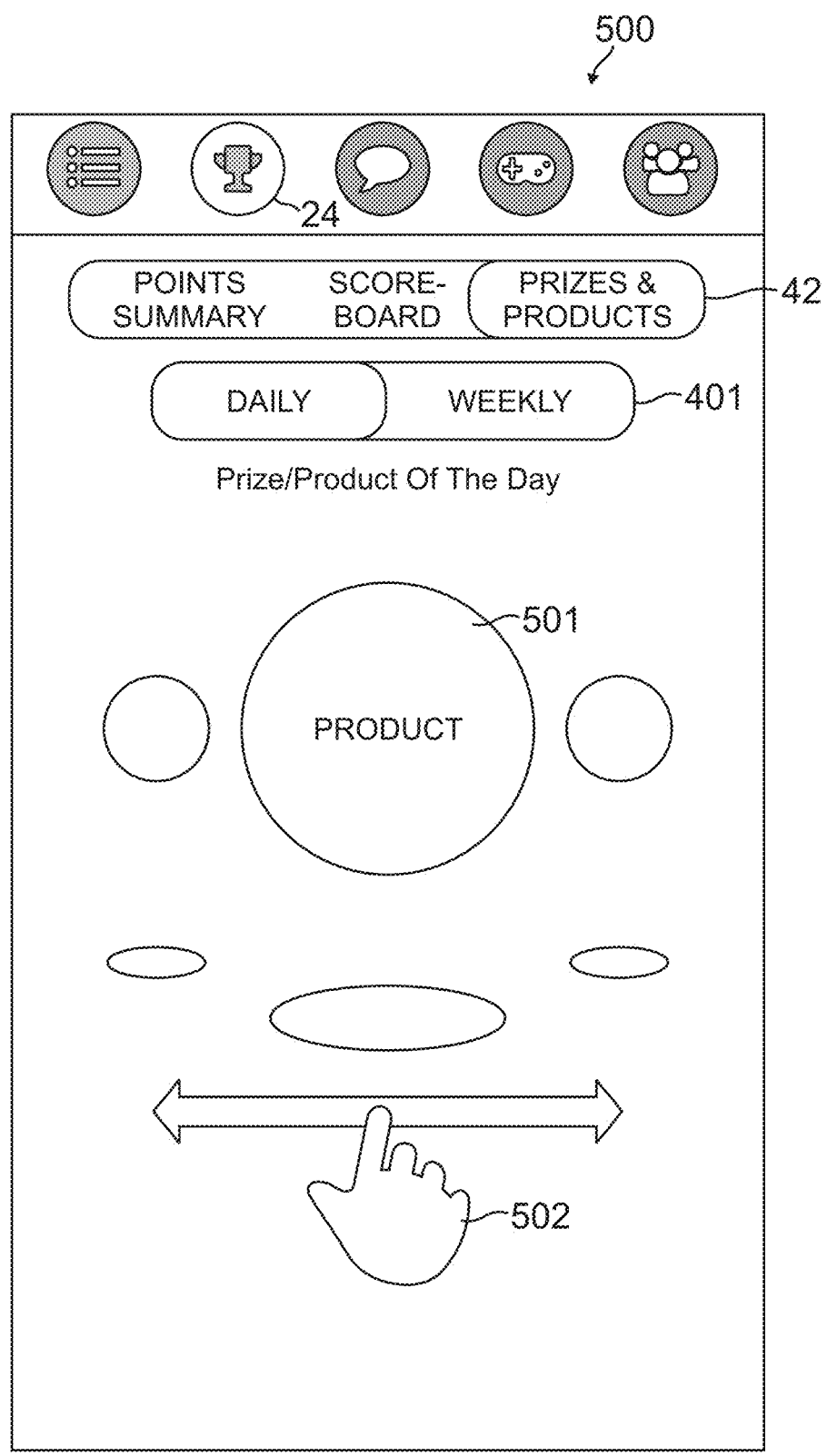
FIG. 5 shows a screenshot from an exemplary communication device or phone operating an exemplary application that may be used as part of the invention, the screenshot showing a featured brand of the one or more brands illustrated in the carousel of FIG. 4.

Referring now to FIG. 5, an exemplary screenshot from a communication device or phone operating an exemplary application that may be used as part of the invention is shown. The screenshot shows a featured brand of the one or more brands illustrated in the carousel of FIG. 4. In one embodiment, the screenshot 500 is displayed when the animation of FIG. 4 ends. The screenshot 500 may display a product/experience 501 featured that day by a first brand or advertiser, e.g., in the foreground of the screenshot 500 (and optionally displayed larger in size than others), and other products/experiences featured by the first brand or advertiser and/or products/experiences featured by alternative brands or advertisers in the background (and optionally smaller in size than the product/experience 501) Other embodiments may be used wherein the product/experience 501 is highlighted as compared to the other products/experiences. The various products/experiences may appear in a carousel, similar to FIG. 4. When the system receives input from the user indicating a desire to rotate the carousel or images (e.g., when the system receives input that the user has swiped the screen to either side or pushed an icon to cause rotation as illustrated using reference numeral 502), the system can rotate and display the other images in the foreground. The system can receive input indicating that a user has selected or chosen a particular brand, prize, product, experience, etc. (e.g., by receiving, input that the user has tapped on a brand/prize/product/experience/etc.)

Figure 6:
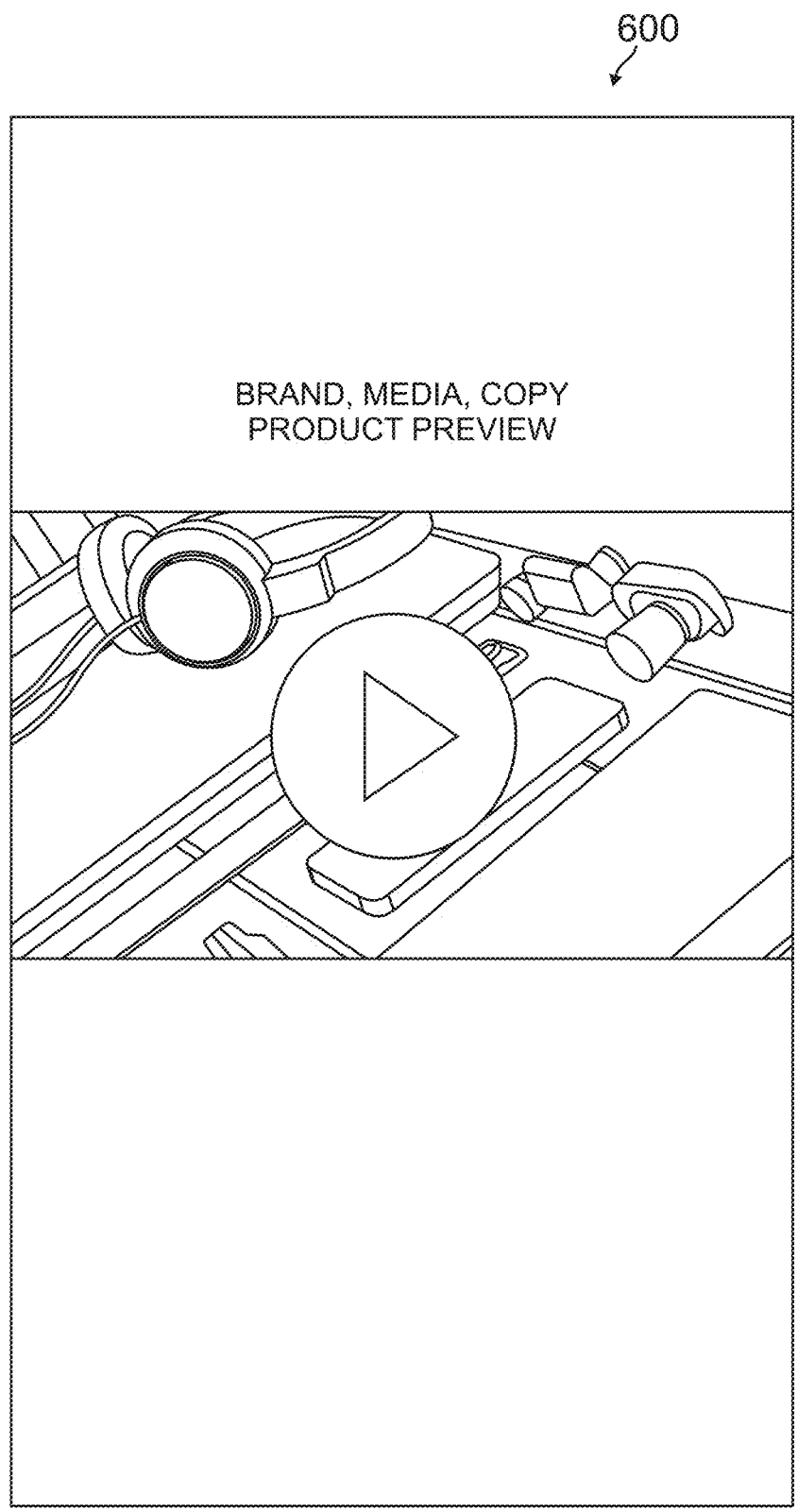
FIG. 6 shows a screenshot from an exemplary communication device or phone operating an exemplary application that may be used as part of the invention, the screenshot showing a video of one or more featured products and/or brands.
Figure 7:
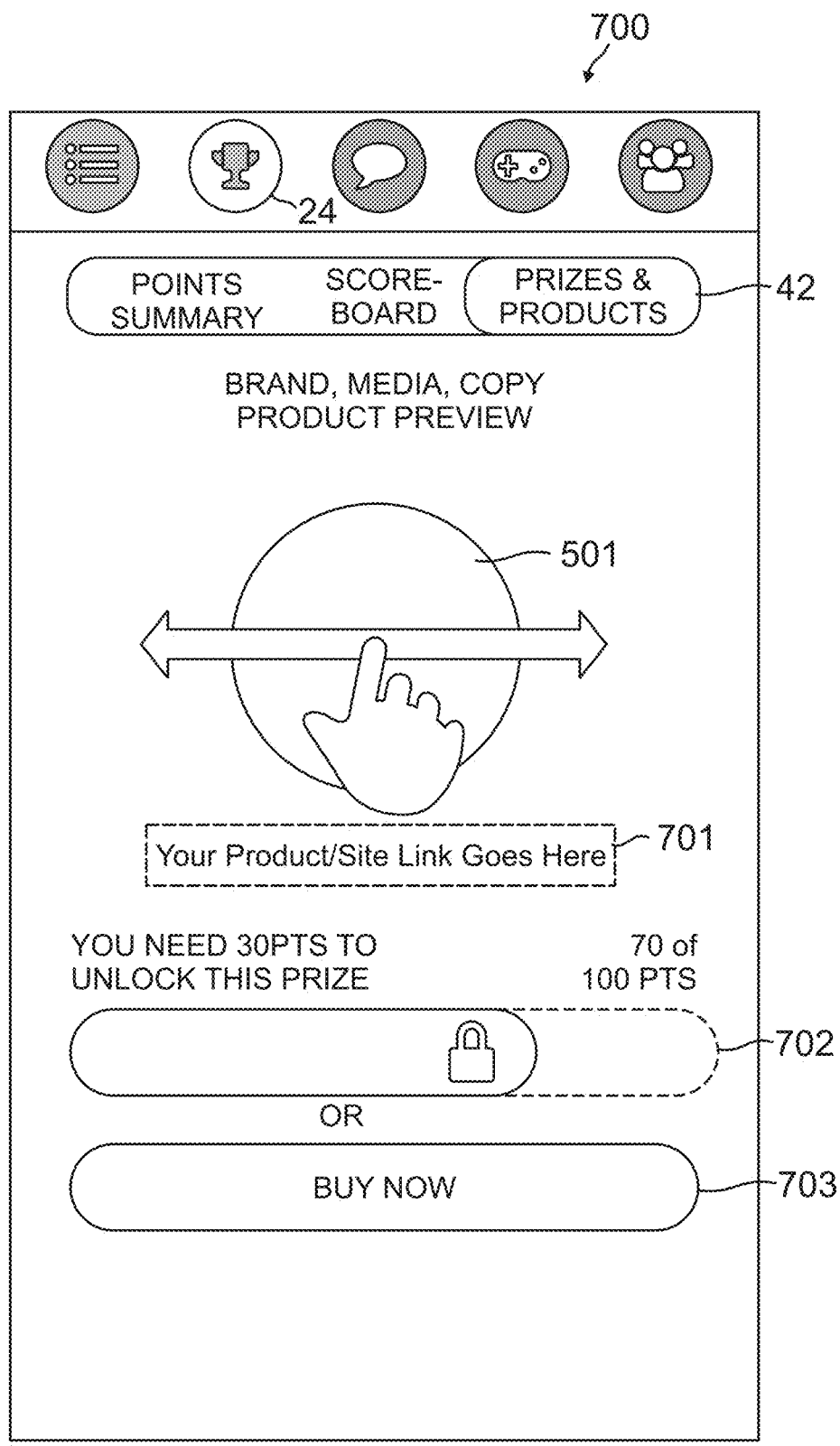
FIG. 7 shows a screenshot from an exemplary communication device or phone operating an exemplary application that may be used as part of the invention, the screenshot showing additional information of a featured product/brand, a current point total and an option to buy the featured product.

Referring to FIG. 6, a screenshot from an exemplary communication device or phone operating an exemplary application that may be used as part of the invention is shown, where the screenshot showing a video of one or more featured products and/or brands. In one embodiment, when the system receives the input indicating the user has selected a brand/prize/product/experience/etc. (e.g., input indicating the user has tapped on a specific product/experience), the screenshot 600 is displayed on the communication device, mobile phone or other electronic device. The screenshot 600 includes a video (e.g., a 5-60 second video), which may be produced by the brand/advertiser and loaded/integrated into the system. Referring to FIG. 7, a screenshot from an exemplary communication device or phone operating an exemplary application that may be used as part of the invention, the screenshot showing additional information of a featured product/brand, a current point total and an option to buy the featured product is shown. In one embodiment, when the video of FIG. 6 has ended, the screen shown in screenshot 700 transition (e.g., may "dissolve" or undergo an alternative transition) such that the screenshot 700 is displayed. The system may display more information/images/videos/etc. provided by the brand/advertiser for the selected product/experience 501. The system may also be configured to display a link 701 to a website of the brand/advertiser's choosing. A point status bar 702 revealing the user's current point status and whether the user has achieved the required amount/point total (e.g., POD—100 points) and/or the user's progress toward the required amount/point total may be displayed. Referring to the example shown in FIG. 7, the point status bar 702 shows that the user has acquired 70 of the 100 points needed to unlock the POD/POW featured (e.g., the selected product/experience 501). If the system determines a user has not met the point requirement, a lock icon may be displayed as in FIG. 7. In one embodiment, a "Buy Now" button 703 may also be provided/displayed by the system, which may be configured to provide the user with an option to directly purchase the product/experience 501, e.g., through a redirected handoff back to the brand's selected Uniform Resource Locator (URL).

Figure 8:
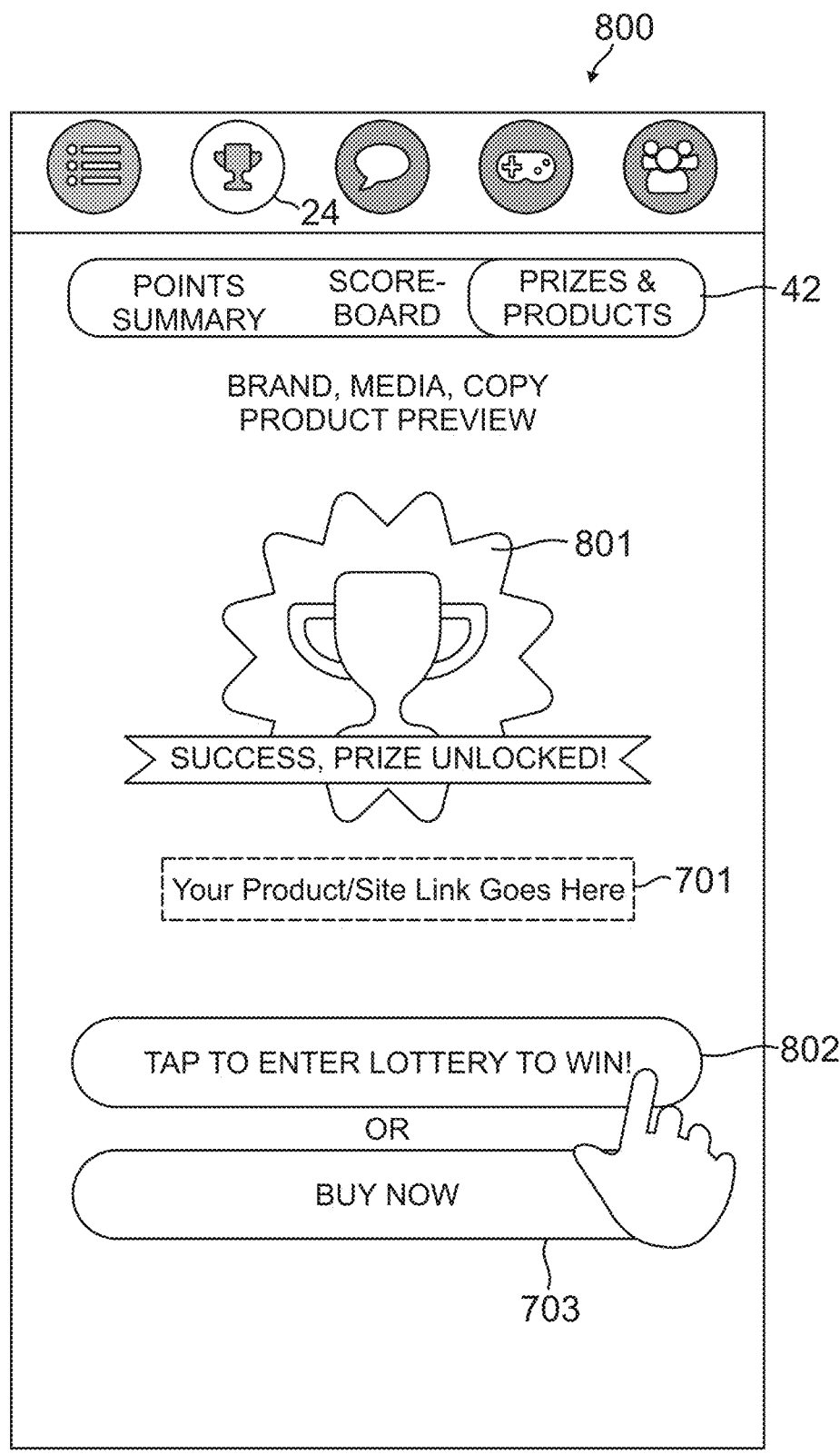
FIG. 8 shows a screenshot from an exemplary communication device or phone operating an exemplary application that may be used as part of the invention, the screenshot presenting an icon notifying the user that a selected product/experience has been unlocked.

Referring to FIG. 8, a screenshot from an exemplary communication device or phone operating an exemplary application that may be used as part of the invention, the screenshot presenting an icon notifying the user that a selected product/experience has been unlocked is shown. In one embodiment, when the system determines that a user has successfully accrued the required amount/point total (e.g., 100 points) within a 24 hour cycle for a POD (or a 7 day cycle for a POW), the screenshot 800 may be displayed to provide an alert (e.g., icon 801) indicating that the user has unlocked a selected prize/product/experience/etc., which may be, for example, the selected product/experience 501 as seen in FIGS. 5 and 7. In one embodiment, when the system determines a user has satisfied the point requirement and has unlocked a selected prize/product/experience/etc. (e.g., a POD), the system may determine the user is eligible to enter (or may automatically enter the user) into a lottery. A tab/button/icon 802 may be displayed for a user to tap to enter the lottery. The lottery may be configured to use a unique identifier (e.g., a username, avatar, cell phone number, one or more unique identifiers (e.g., zip, phone, email), etc.) to identify participants in the lottery. The lottery may be conducted randomly and/or automatically by the system, e.g., at a specified time. Additionally, input to the system may be generated by the activation of the "Buy Now" button or icon 703 (e.g., including the text "BUY NOW" or other, similar text). Activation of the "Buy Now" button 703 may result in the system display a shopping cart screen, not shown, for the user to continue an electronic check-out process to purchase the prize/product/experience/etc. The brand/advertiser may also offer a promotion for a user to purchase the prize/product/experience/etc., which may be displayed along with the "Buy Now" button 703 as shown in FIG. 9.

Figure 9:
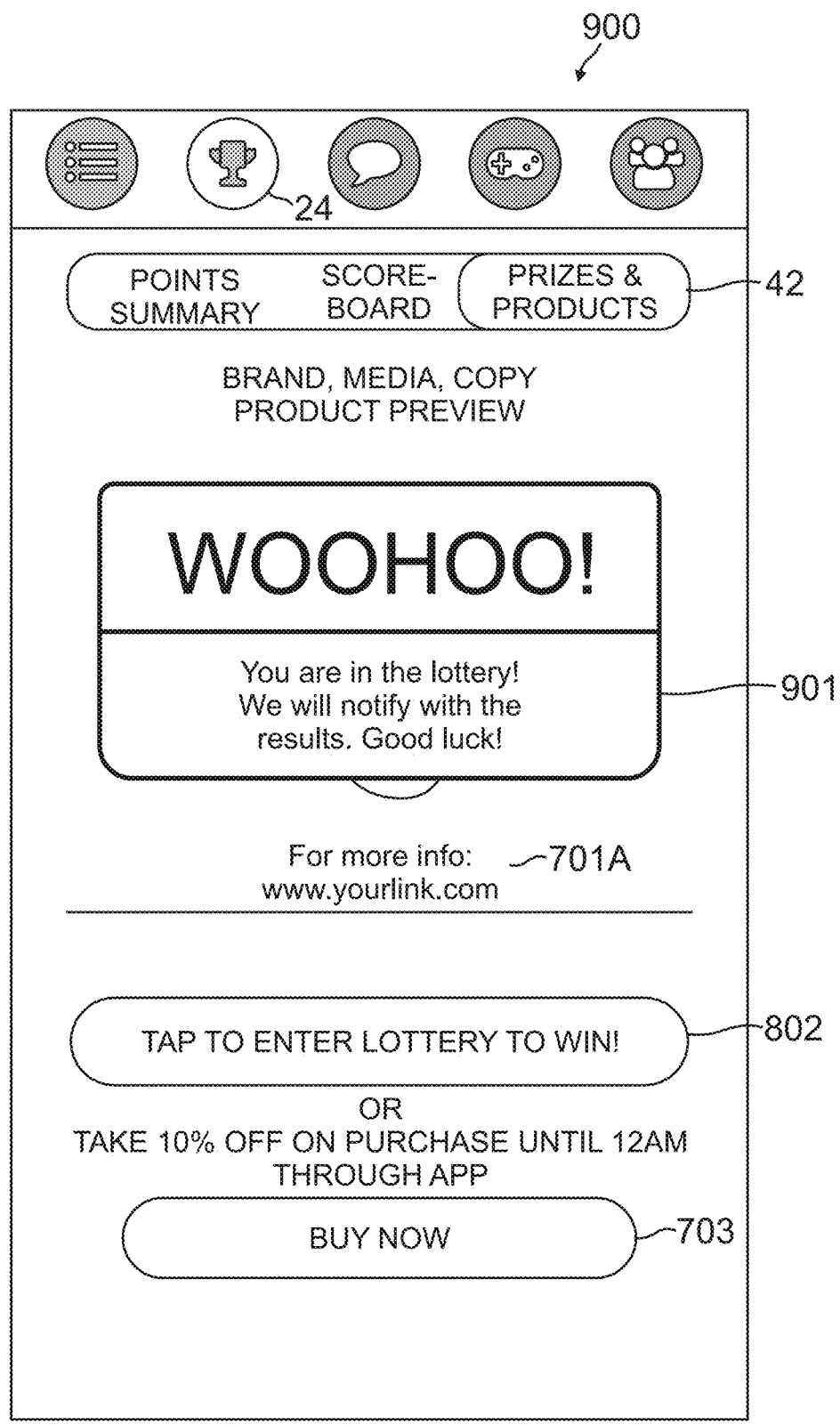
FIG. 9 shows a screenshot from an exemplary communication device or phone operating an exemplary application that may be used as part of the invention, the screenshot presenting an icon notifying the user has successfully entered the lottery for a selected prize/product/experience/etc.

Referring now to FIG. 9, a screenshot from an exemplary communication device or phone operating an exemplary application that may be used as part of the invention, the screenshot presenting an icon notifying the user has successfully entered the lottery for a selected prize/product/experience/etc. is shown. In one embodiment, when the system receives input indicating the user has selected, or tapped to enter the lottery, the system may display an icon 901 which may be an image, pop up, notice, alert, etc. that indicates the user is now in the lottery as shown in, for example, the screenshot 900. In one embodiment the screenshot 900 may be "grayed out" except for the icon 901 in order to focus attention on the icon 901. In another embodiment, the icon 901 may appear in the foreground of the screenshot 900 and other components such as a link 701A to a website of the brand/advertiser's choosing, the tab/button/icon 802 and the "Buy Now" button 703 may appear in the background of the screenshot 900.

Figure 10:
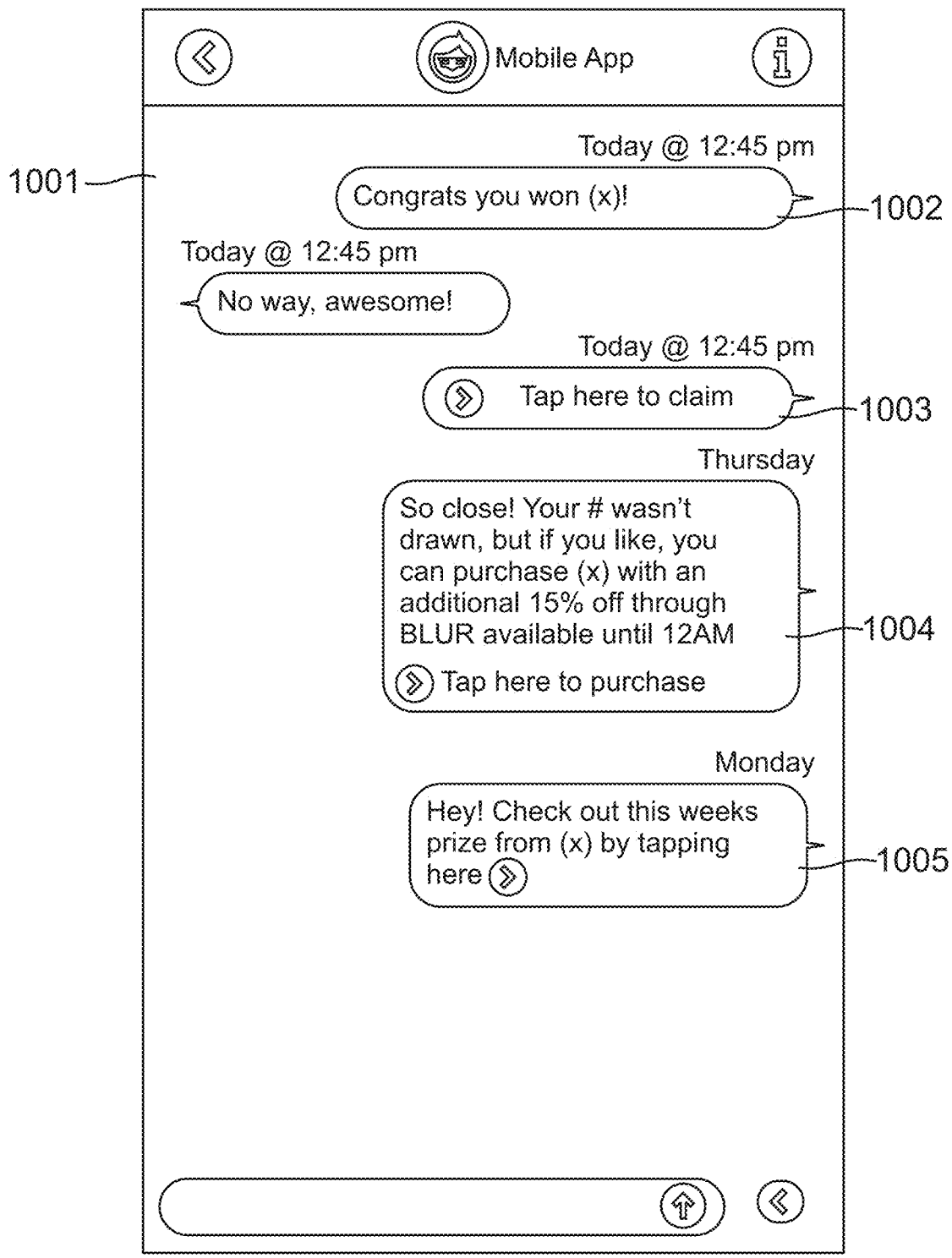
FIG. 10 shows a screenshot from an exemplary communication device or phone operating an exemplary application that may be used as part of the invention, the screenshot illustrates a chat/message screen between user and the system.

Referring to FIG. 10, a screenshot from an exemplary communication device or phone operating an exemplary application that may be used as part of the invention, the screenshot illustrates a chat/message screen between user and the system is shown. In one embodiment, as illustrated in the chat screen 1001, the system may transmit one or more messages (e.g., SMS, MMS, etc.) to a user to notify the user that he/she has won a lottery for a POD/POW (e.g., message 1002), provide a means for the user to claim the prize/product/experience/etc as a result of winning the lottery (e.g., message 1003), provide the user with notice that he/she did not win the lottery but offer a discount on purchasing the prize/product/experience/etc. (e.g., message 1004), or provide news/information to the user (e.g., message 1005) In one embodiment, the means provided to the user for claiming the prize/product/experience/etc may be done digitally, e.g., with QR, Barcode, or unique redemption ID, which may be created and provided to the system by the brand/advertiser for online or in store redemption by the user. Any prize redemption options/methods described elsewhere could also be provided/used. In one embodiment, a "redeem now" CTA (call to action) could direct the user to the brand/advertiser's checkout screen wherein a shipping and handling/procurement processes may direct the user through the checkout process. Similarly, a link may be provided to the user for the user to activate and subsequently redeem his/her prize/product/experience/etc.

Also within the information/communication areas (e.g., newsfeed, messaging, chat, etc.), the system may be able to highlight or push promotions on items of interest. For example, if a user entered into the lottery for a product/experience/etc. but did not win, the system may provide the user with options to purchase the item of interest at a discount. The system may be able to use a communication area (e.g., newsfeed, chat, etc.) as an to display/highlight the POD/POW/etc. segment to one or more users, e.g., via a periodic or occasional message (e.g., a once per week notice message). In some communication areas (e.g., newsfeed, etc.), every user may be treated a friend and have access to at least some information displayed.

On each of the relevant screens (e.g., as seen on FIGS. 4-5), the system may be able to detect if a user has provided input to toggle to the POW segment. The POW segment (or other time period segments, e.g., biweekly, monthly, semiannual, annual, or any other time period) may be configured to look and act the same as or similar to the POD segment. In one embodiment, prizes over longer periods of time may be higher in value or be big ticket items, e.g., a car, vacation package, bike, celebrity experience, etc.) In one embodiment, the system may only allow users to be in the running for certain prizes/experiences/etc. if they meet certain preset requirements, e.g., a perfect score of 700 points for a week or 100 points/day for seven days. The system may allow a user to purchase at any time. In one embodiment, the system may allow users entering into the POD segments to redeem won prizes/experiences/etc. daily, while the POW segment may only allow users to redeem won prizes/experiences/etc. after seven days (or another time period for other time segments).

As shown in FIG. 11, the conversation or messaging link 26 may show a new activity indicator 64 when new messages are received from another user (e.g., a contact or, friend). In FIG. 11, the new activity indicator shows the number six, indicating that 6 new messages have been received since the last time messages were reviewed by the user. New message indicators 70 show that two new messages were received from the first friend and four new messages were received from the second friend. The indicators 70 can add up to match the number shown in indicator 64. Other uses of indicators 64 and indicators 70 are also possible. A new message link 72 may be provided that if input is received that a user has selected the link 72, the system allows a user to initiate a conversation or message to another person, contact, or friend.

Figure 12:
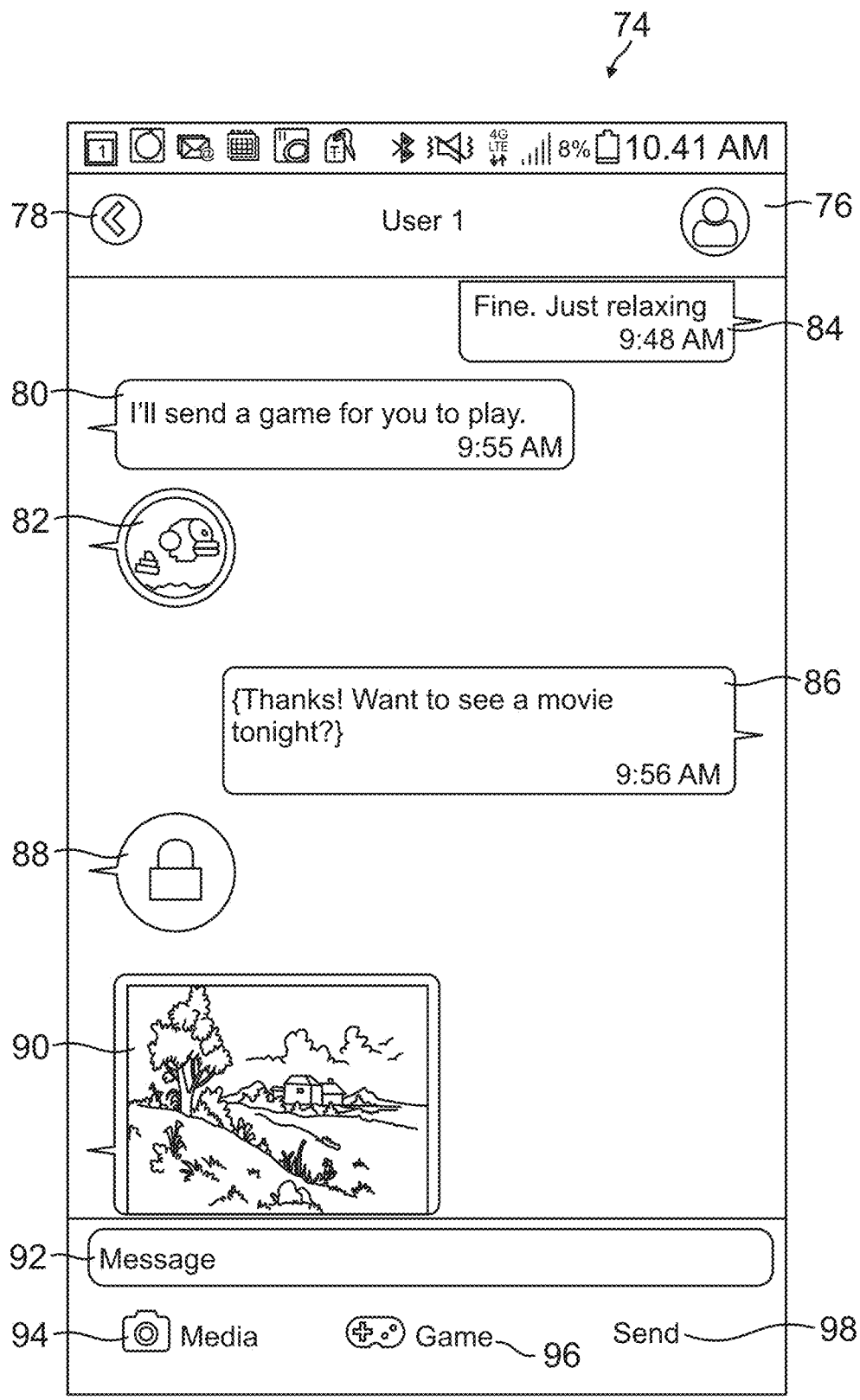
FIG. 12 shows a screenshot from an exemplary communication device or phone operating an exemplary application that may be used as part of the invention, the screenshot showing an exemplary conversation or messaging exchange with one of the user's friends/contacts.

In response to receiving input that a conversation link has been selected (e.g., that a user has selected or tapped on message summary 68 or icons for friends 66), the system may open and display the selected conversation and any new messages, etc. FIG. 12 shows an example of an open conversation displayed in exemplary screenshot 74. The conversation identification bar 76 at the top of the screen can display the user's friend or contact that the conversation is with, including the users image, icon, avatar, etc. and the person's name and/or user name. Any screens shown or used may include a back button/link 78 that can tell the system to go back to the previous screen, e.g., the back button/link 78 shown in FIG. 12 may tell the system to return to the conversation/messaging screen as shown, for example, in FIG. 11.

Below the conversation identification bar 76 in FIG. 12 is shown a portion of an exemplary conversation between a user and one of the user's contacts/friends. Different types of messages may be sent between users. For example, text messages 80 and 84 are simple messages that are unencrypted and alphanumeric. Game message 82 is an electronic/video game sent as a message from one user to another. If the system receives input that a game message 82 has been selected (e.g., by a user tapping the game message 82), then the system may launch the electronic/video game. The user may play the electronic/video game to completion, until a desired score is reached, until the user runs out of time, until an objective is reached, and/or as otherwise desired. A game message 82 may be play repeatedly or as often as desired. The game message 82 can be sent with or without being encrypted, hidden, or locked. The system can allow for game message 82 to be sent and played without requiring a download by the recipient or sender.

Media messages like media message 90 may also be sent and may comprise media in addition to or instead of alphanumeric text, e.g., the media may comprise a video, image, sound clip, hyperlink, other media, or a combination of these. A media button/link 94 may be provided to allow selection of the desired media for messaging. If the system receives input indicating that the media button/link 94 has been selected, the system may display media that the user might want to attach as a message, may link to the camera (e.g., a device's built-in camera) to allow the user to take a picture or video for the message at that time, may link to a microphone (e.g., a device's microphone) to allow the user to take a picture or video for the message at that time, may provide options/links for browsing media stored on the device, and/or provide other options for accessing media.

A message field 92 may be provided. The system may receive and process messages to be sent based on messages (e.g., alphanumeric text) entered into the message field 92. A send button/link 98 may also be provided. If the system receives input that a message has been entered into the message field 92 and input that the send button/link 98 has been selected, the system may send the message to the desired recipient. The send button/link 98 may also trigger the system to "lock" (e.g., hide, encrypt, or otherwise prevent opening of) the message, if the system receives input that the message should be "locked." Optionally, system may be configured to receive, interpret, and process voice commands used to compose and send messages, and to instruct the system whether or not to lock a message and how (e.g., "lock message with Breakout game"). Sound or voice data may thereby automatically trigger the system to hide, lock, or encrypt the message or show the message as locked until the recipient unlocks the message. In one embodiment, the system may also be configured to receive and process similar input from 3D touch, user interface ("UI") gestures, and/or other interactions or input methods.

Locked messages 86 and 88 may be sent. Locked messages may be messages that are hidden, encrypted, or otherwise prevented from being viewed until something occurs to "unlock" or make the message viewable. Text messages, media messages, game messages, and/or other messages may be locked and sent as locked messages. Locked message 86 was sent by the user to another person, e.g., a friend or contact. The user who wrote the locked message 86 can see the message and the system indicates that it was sent as a locked message by including brackets on either side of the message. Including brackets on either side of the message is one way to show that the message was locked, but other ways of showing the message was hidden, locked, or encrypted are also possible, e.g., showing an image/icon of a lock or other image/icon that indicates the message was locked, or using different colors, fonts, styles, etc. to set distinguish the message from other unencrypted messages, like text messages 80 and 84. When a locked message is received from another person, it may look similar to locked message 88 or otherwise be in a format that indicates the message is locked. To open the locked messages 86 and 88, the recipient or friend to whom the message was sent will have to "unlock" the message by completing some objective or set of steps required before the system will display the image.

Figure 13:
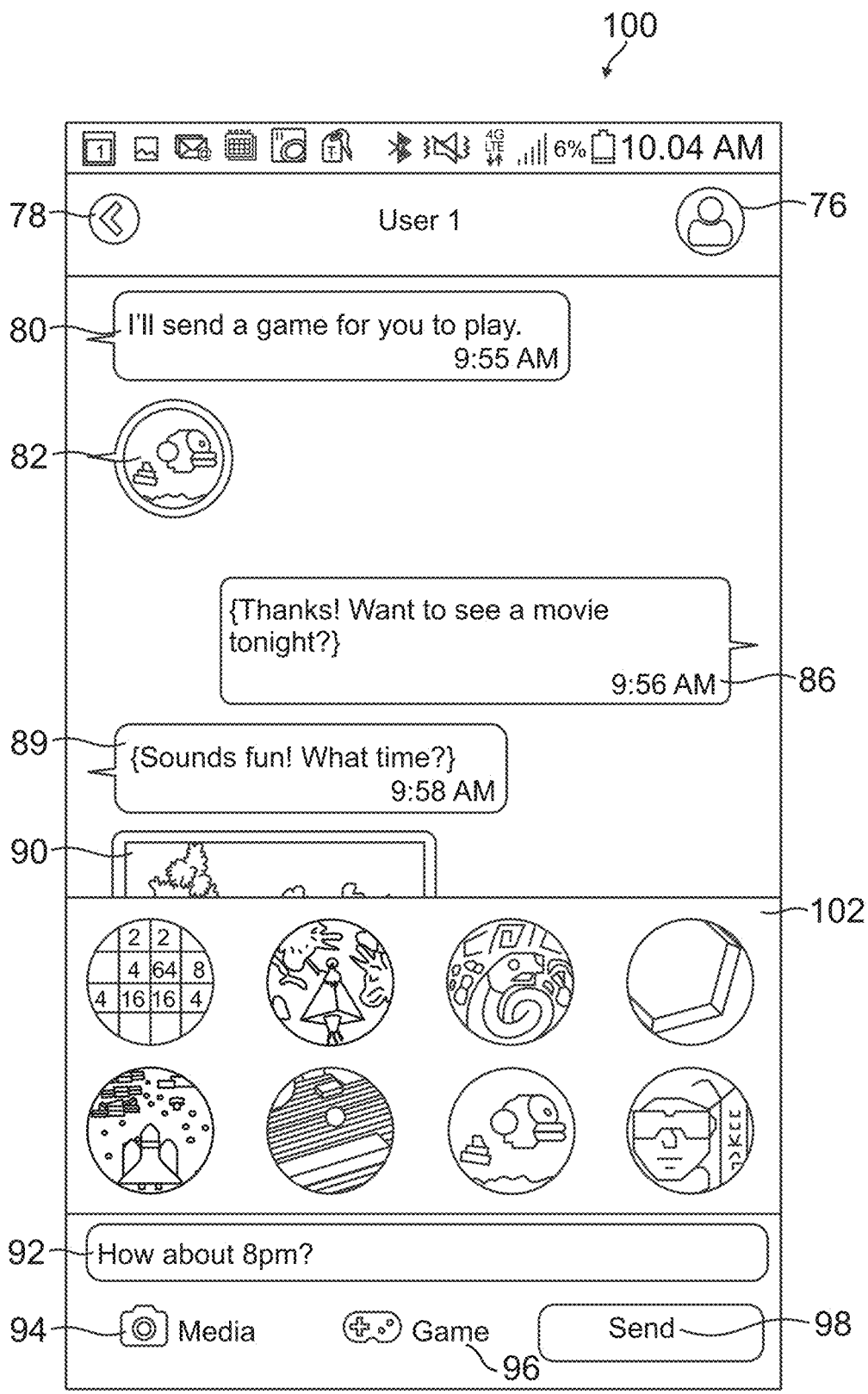
FIG. 13 shows an exemplary screenshot of a conversation or messaging exchange similar to that in FIG. 12, the screenshot showing a game menu for locking a message with a game.

In one embodiment, the locked messages 86 and 88 are locked (e.g., hidden, encrypted, or otherwise prevented from being viewed) using an electronic or video game, and one must play the game to open or display the message. FIG. 13 shows an exemplary screenshot 100 that is within the same conversation or messaging exchange as shown in FIG. 12, but that includes the game menu 102. The system can display the game menu 102 in response to receiving input that game menu button/icon 96 has been selected. The game menu 102 can show a variety of different types of games that can be used to hide, lock, or encrypt a message. In response to receiving input that a game has been selected, that a message (e.g., a text message or media message) has been entered, and that the send button 98 has been selected, the system may automatically generate data indicating that the message should be hidden or locked, or may encrypt the message, with the selected electronic/video game to form a locked message (e.g., similar to locked messages 86 and 88) and send the locked message to the intended recipient. The locked message may be a locked text message, locked media message, locked game message, or other type of message that is locked. The intended recipient must then play the electronic/video game before the message is "unlocked" and the message can be viewed. Successfully unlocking and/or opening the locked message may require completion of the game, satisfying a point requirement, or satisfying some other objective.

In one embodiment, the game objectives (e.g., completion, minimum score, number of items collected, beating a game/level in a limited amount of time, or other objectives) are predetermined and a recipient of a locked message must only satisfy the predetermined objective to open the message. In one embodiment, the game objective may be customizable by the sender. For example, the sender could make the game objective very easy to satisfy, so the recipient will quickly be able to unlock and read the message. Also, the sender could, make the game objective more difficult to satisfy, so the recipient will need to take more time and effort to unlock and read the message. In one embodiment, the game objectives may be predetermined, customizable, or a combination of the two. The logic may provide tools and/or a user interface for the user to use in customizing a game or objective. In one embodiment, examples of the tools for user in customizing a game or objective (or creation thereof) may include, but is not limited or restricted to, logic components that provide video game building blocks including predesigned levels, characters, storylines, etc., customizable options for the building blocks, video game templates, APIs, tutorials on video game customization and/or creation, etc.

Once a game objective has been achieved and a locked message is "unlocked," the message may appear or be displayed in the conversation or messaging exchange, so the recipient may read the message or view the media that was sent. For example, locked message 88 in FIG. 12 may appear as unlocked message 89, as shown in FIG. 13, after the game objective has been completed and the message opened. Brackets or some other indicator (e.g., an icon or image or different color, font, style, etc.) may be provided/shown to indicate that the message was previously locked. In one embodiment, the system may allow a recipient or sender to re-lock or encrypt a message after it has been read to help keep the message/information private and secure.

In one embodiment, a set of predetermined games is provided (e.g., as shown in game menu 102 of FIG. 13) that may be used to lock or encrypt a message (e.g., a text message or media message). The games may consist of the a variety of games, including new games, classic video game remakes, puzzles, trivia, learning games and more. In one embodiment, aspects of the predetermined games may be customized by the user, e.g., game objectives, quests, missions, levels, characters, avatars, colors, background, styles, fonts, or other features, to create a customized game. In one embodiment, the user may also create a customized game by creating a new game or level using basic building blocks or tools that may be provided by the system, or a new game or level may loaded to the system if it is compatible or made compatible. In one embodiment, the system is able to automatically convert or make compatible a variety of games that may be loaded to the system. The system may provide the user with various options and/or interfaces for customizing a game for a particular person, contact, or friend. In one embodiment, the system may enable personalized games (e.g., a puzzle of one or many of the user's pictures) to be sent to a particular person. Many customized and/or otherwise unique games may also be developed by indie developers and be provided by the system to users as an option to lock a message. Once the system has received input indicating that the user is finished customizing the electronic/video game or has selected a customized electronic/video game (or other electronic/video game) and desires to hide, lock, or encrypt a message with the electronic/video game, the system can automatically hide, lock, or encrypt the message with the electronic/video game such that the recipient cannot read the message without first playing, the customized electronic/video game (or other selected electronic/video game) and achieving the required objective. The system, messages, and games may also be used as an educational tool, e.g., to teach computer programming, design, math, grammar, etc. They may even be used for testing or as part of a job interview, e.g., to test competencies for certain skills (for example, computer programming, language, problem solving, etc.).

In one embodiment, group messages (i.e., messages to more than one recipient) may also be sent. The group messages may be standard messages (e.g., unlocked text or media messages) or may be locked messages (e.g., messages that are hidden, locked, or encrypted). If a group message is sent to more than one user, the message may be set such that it can be unlocked by one of the recipients such that each recipient can then read the unlocked message when one person unlocks it, or, optionally, each recipient may be required to unlock the message individually. In one embodiment, the group message may be hidden, locked, or encrypted with a game from game menu 102 or with a customized game in a similar manner to that discussed above. In one embodiment, the game may be a competitive, two-player, or multiple-player game in which the recipients can play against each other. The winner may be able to unlock the message and/or win points, an award, trophy, prize, etc. The loser(s) may not be able to open the message or may be able to open the message, but not receive all the same benefits as the winner. The game may also be cooperative, in which the recipients must work together to complete the game objectives and open the message. In one embodiment, multiple users must advance through a game together to reveal or unlock certain rewards. In one embodiment, objectives may be similar to a scavenger hunt. Various competitions and/or contests may be conducted using group messages and various, prizes, awards, rewards, trophies, etc. may be generated, awarded, and displayed by the system.

In one embodiment, the system may enable user challenges (e.g., one to one or one to group) challenges. For example, the system may enable a user to challenge other users in certain games or contests (e.g., as described above) in the system or platform. A user's points or other rewards may be used as a form of "bet currency," e.g., a user may have certain number of points (e.g., 4,000 points) and want to challenge another person in a certain game, whether real-time or not, for some of those points (e.g., 500 points). The win parameters may be defined based on time, points collected before fail or advancement, for example. The system may automatically determine the winner of the challenge, deduct points from the loser, and award the points to the winner. Opening locked messages from one of the users, a third party, a company, brand, or the system may be an objective of the challenge and/or may reveal clues/ information necessary to win the challenge.

The system and gaming platform may be used for marketing or brand engagement. In one embodiment, the system may be used for targeted marketing and may gather information regarding demographics of users, shopping inclinations, and friend interests, and may also geo-target "gifted" discounts. In one embodiment, the system or gaming platform may enable companies and brands to create and/or feature unique branded games, e.g., games including icons, trademark, images, phrases, etc., related to the company or brand. In one embodiment, the game may feature a character or person associated with the company. In one embodiment, a brand, trademark, etc. may show up as objects in the game or may be part of the background. The system or gaming platform may also include deals, promotions, or coupons in message. For example, a company may send out a locked message with a coupon, promotion, or deal, or the system may be authorized to automatically generate and send coupons, promotions, or deals to certain people (e.g., people who meet certain criteria, for example, based on location, interests, etc.). If a recipient is able to complete the game and unlock the message, the recipient may access/use the reward, coupon, promotion, or deal. The reward, coupon, promotion, or deal may be generated, attached, and/or displayed by the system in the form of a Quick Response ("QR") code, barcode, unique alphanumeric promo identification ("ID") code that can be entered into a website to redeem, etc. The system or platform can store these rewards, coupons, promotions, or deals in a digital store within the system, platform, or app for users to browse, explore and ultimately redeem online or in store. Branded games, locked messages, promotions, coupons, etc. may be circulated in to a user's conversations or feed by the system as the system or app is used. Branded games, locked messages, promotions, coupons, etc. may be targeted to the user based on their age, location, gender, app usage, interests, etc. or may be randomized. The system may also obtain input or data from friends/contacts of a user and select specific brands for a user based on interests, characteristics, or suggestions of friends/contacts.

Advertising/marketing with branded games, promotions, locked messages, and other features described herein may be geo-targeted. For example, the system or game platform might obtain permission to track and may track a user's location using a Global Positioning System ("GPS"), Bluetooth technologies, Near Field Communications ("NFC"), Beacon technology, geofencing, gyroscope, accelerometer, geolocation, tagging, and/or other tracking associated with the communication device or phone of the user, or a combination of these. The system may automatically generate and provide coupons, deals, promotions, etc. based on location information. The system may base these at least partially on criteria or information received from companies that provide parameters for coupons, deals, promotions, etc. that the system is allowed to generate and in what circumstances. For example, in one embodiment, the system or game platform may automatically provide authorized offers based on a user's location, e.g., send a message or locked message with a coupon to a restaurant or store nearby the user's current location. The system may be able to store a user's rewards, electronic coupons, vouchers, codes, etc. that can be redeemed in physical locations (stores) or for online shopping. The system may enable companies and brands to target users or use the system to target users currently or frequently in or near the company/brand's physical location(s) and offer special promotions or unlockable messages with promotions, deals, etc. available only in that area via messaging. For example, a company/store (e.g., Starbucks) may have games that the system prevents from being played at any location other than at the company/store (e.g., you can only play the game at Starbucks).

In one embodiment, certain actions must be performed in certain locations to unlock a message, promotion, etc. For example, the system may require a user to "do the wave" at a stadium to unlock a message, promotion, etc. The communication device's or phone's motion, tilt, location, and/or other sensors may sense the proper motion and the geolocation information to unlock the message, e.g., to sense the wave in the right location to unlock a discount on a hot dog, drink, or meal at the game.

In one embodiment, a system, platform, or app may be provided that acts as a one to one and/or a one to many messaging app consisting of personal contacts/friends, and a platform connecting users to brands, services, institutions and brick and mortar entities via chat, messaging, gaming, or a combination of these. The system, platform, or app may utilize a lock/unlock feature to reveal messages, gifts, deals, prizes, rewards, promotions, etc. Companies or brands may be added as contacts that can be followed, and the platform or app can cause messages and electronic games to be sent and viewed as with personal contacts/friends. For example, a company like Lyft could be a contact, and if the system receives input that a user is at a particular location (e.g., "33rd and 5th") and needs a ride, the system can send a message to Lyft and a ride may be provided to the user. The system may automatically or in response to input received from Lyft, send a promotional locked message to the user, such that if the user is able to complete a game and unlock the message, then the user may receive a discount or other promotion for the ride or future rides. Similar uses are possible with other companies/brands as well, e.g., the system may receive input from a user indicating a need/desire for something, and respond by sending a message to a company or brand to order/purchase items, request services, send services, etc. Artists, bands, authors, actors, bloggers, celebrities, etc. may also use the system or be followed on the system. The system/platform/app may enable them to provide exclusive content to fans or followers and promote upcoming events, releases, etc.

A game link 28 may also be provided on the home and/or other screens. When the system receives input that the game link 28 has been selected, the system may process the information and display a game screen, e.g. as shown in screenshot 104 in FIG. 14. The game screen may allow a user to select different games to play for entertainment, practice, or other reasons. The games may be the same games that can be used for locking or encrypting a message or may be games used solely for entertainment or games used for other reasons. The game screen may include a game section 108 that allows a user to view the games available to play, e.g., in a list or tile arrangement. If the system receives input that a game has been highlighted, tapped once, or otherwise selected, the window 106 may show a larger version of the game or provide information about or instructions for the game. If the system receives input that the game has been tapped a second time or otherwise further selected for playing, the system may launch the game for playing by the user.

Figure 14:
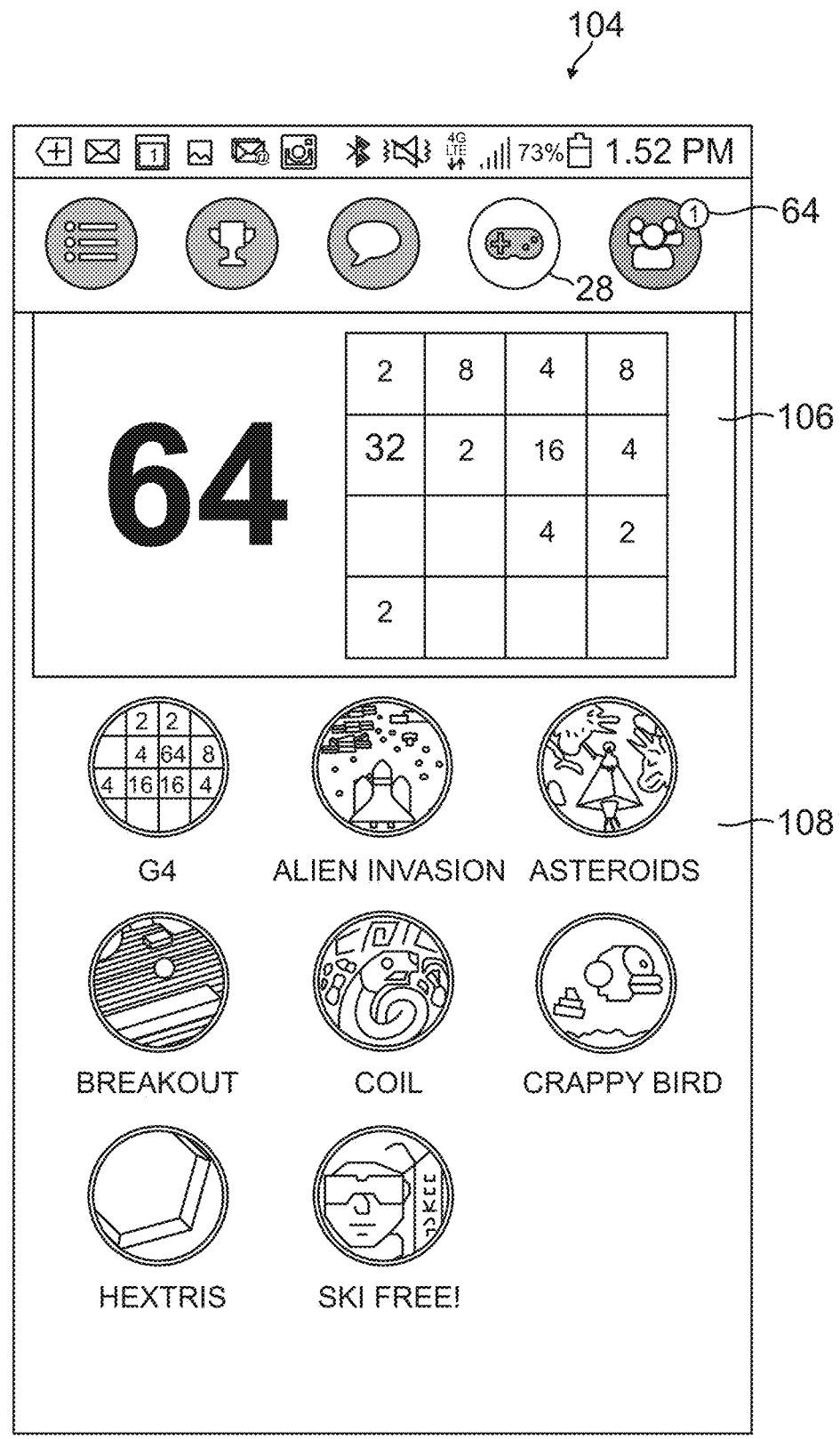
FIG. 14 shows a screenshot from an exemplary communication device or phone operating an exemplary application that may be used as part of the invention, the screenshot showing an exemplary game screen from which games can be launched to play without being associated with a message.

Many different types of games are possible for use with messaging and/or for play on the game screen. For example, FIG. 14 shows the games: 64; Alien Invasion; Asteroids; Breakout, Coil; Crappy Bird; Hextris; and Ski Free. These games have different designs, rules, actions, and objectives. For example, 64 involves sliding and combining numbers until enough numbers have been combined to reach 64; Alien Invasion involves shooting aliens with a spaceship as the aliens descend the screen; Asteroids involves a spaceship that can rotate to shoot other spaceships and where things wrap around such that something traveling outside the screen on one side appears on the opposite side; Breakout involves a paddle moveable along the bottom of the screen that is used to deflect a ball up to remove bars/blocks at the top of the screen that disappear when the ball hits them; Coil involves drawing closed circles around various dots before they explode; Crappy Bird involves tapping the screen to cause a bird to flap and rise and navigating the bird through obstacles to collect dots; Hextris involves a rotatable hexagon and bars of different colors that fall to the hexagon on various sides getting, a group (e.g., three) of the same color to touch causes them to disappear; and Ski Free involves controlling a downhill skier and avoiding obstacles in his path, Many other games are also possible and customization or level creation for these and other games are also possible. The games may programmed in various different languages, e.g., some may be in html5, Objective C (iOS), Java (Android), or others.

The electronic/video games may have a save feature which allows the user to save the particular game play or any customization for subsequent use and/or editing. In one embodiment, the system or gaming platform may enable a user to upload a game or customized game for others to view, play, and/or further customize/edit.

The system or game platform will also be unique in that it may enable users to sample exclusive mobile games without the need to download the games. The system or gaming platform will present game developers a novel opportunity to enable users to sample their games without downloading and bypass app stores. In one embodiment, a user may not be able to lock a message with a game or purchase a game for use, unless the system has received input that the user has first played and unlocked the game by meeting some set game objective.

Figure 15:
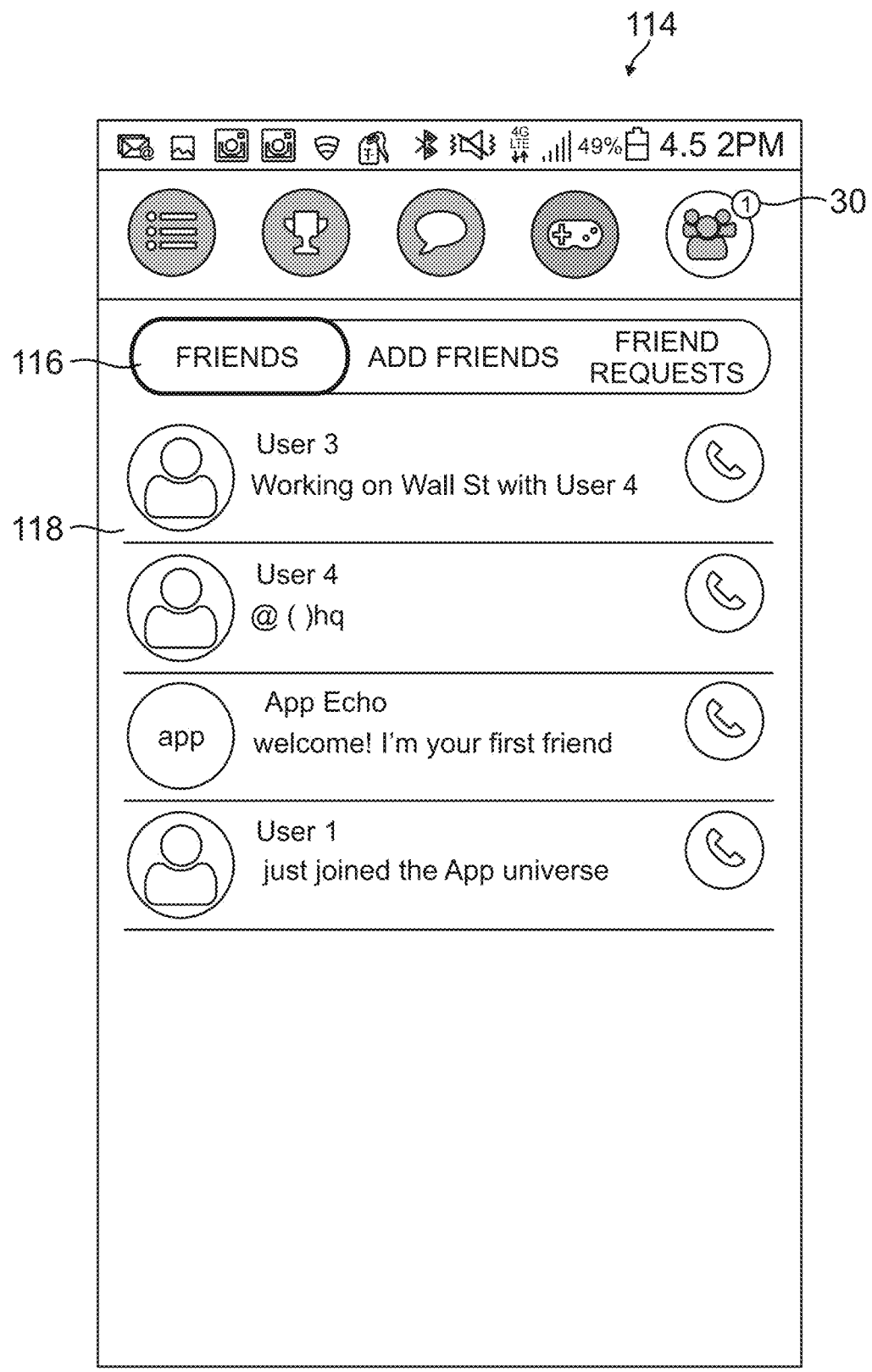
FIG. 15 shows a screenshot from an exemplary communication device or phone operating an, exemplary application that may be used as part of the invention, the screenshot showing an exemplary relationships or friends screen with a list of friends/contacts.
Figure 16:
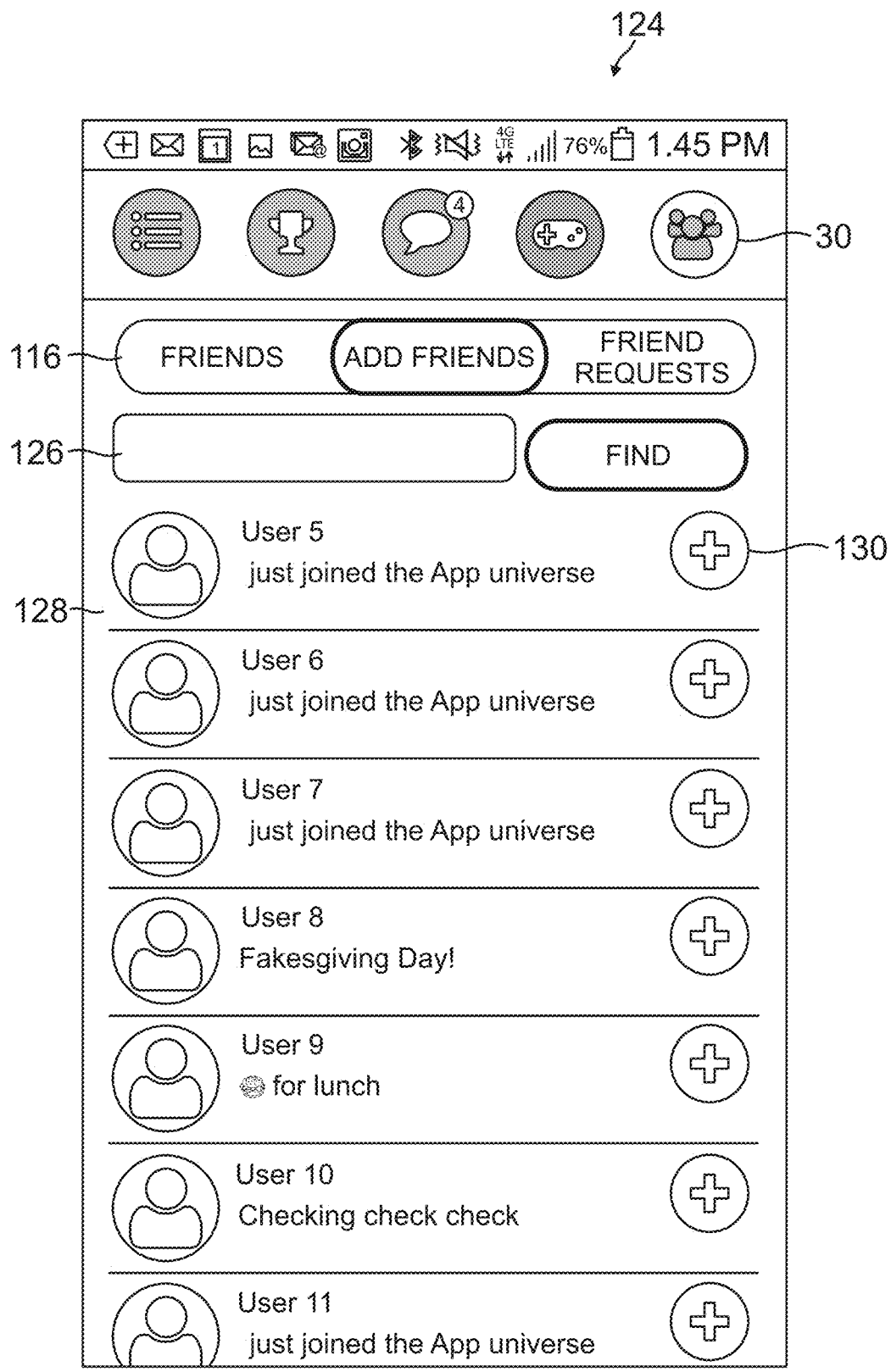
FIG. 16 shows a screenshot from an exemplary communication device or phone operating an exemplary application that may be used as part of the invention, the screenshot showing an exemplary relationships or friends screen with a search field to find new friends and a list of suggested or potential new friends/contacts.
Figure 17:
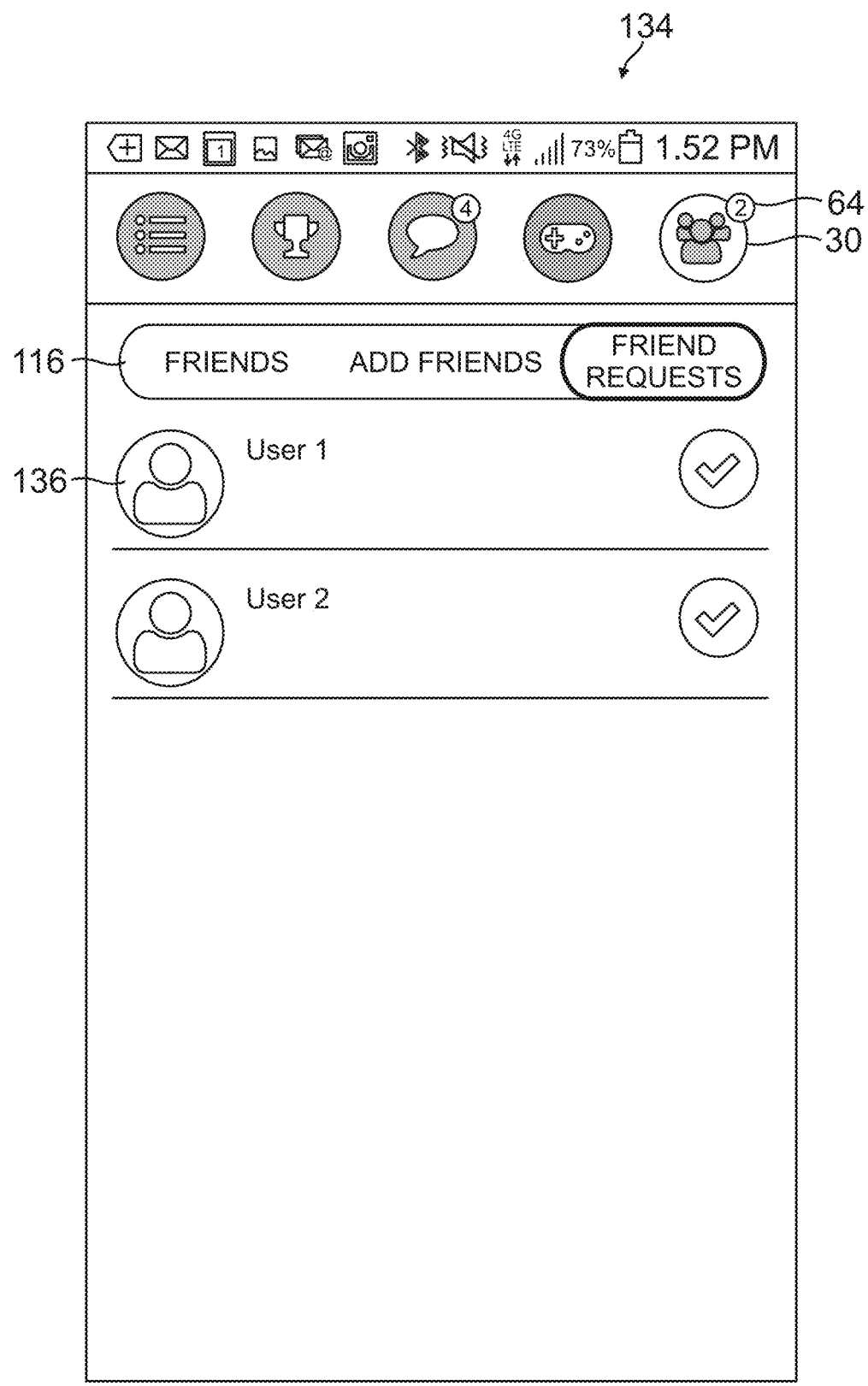
FIG. 17 shows a screenshot from an exemplary communication device or phone operating an, exemplary application that may be used as part of the invention, the screenshot showing an exemplary relationships or friends screen with a list of friend requests.

A relationship/friend link 30 may also be provided on the home and/or other screens. When the system receives input that the relationship/friend link 30 has been selected, the system may process the information and display a relationship/friend screen, e.g. as shown in screenshots 114, 124, and 134 in FIGS. 15-17. FIG. 15 shows an exemplary screenshot 114 of an exemplary relationship/friend screen. FIGS. 15-17 show relationship/friend link 30 with inverted shading or colors from the other links at the top of the screen to indicate that it has been selected, but other ways of distinguishing the link that has been selected are possible as discussed above. FIG. 15 also shows a sliding bar 116 and a list 118 of connected friends/contacts. The sliding bar 116 may allow for switching between different screens, e.g., between screenshot 114, 124, and 134 or between a friends screen (e.g., similar to that shown in FIG. 15 that shows friend/contact connections), an add friends screen (e.g., similar to that shown in FIG. 16 that provides suggestions of friends to add and/or search options to find friends/contacts and connect with them), and a Friend Requests screen (e.g., similar to that shown in FIG. 17 that shows requests to connect initiated by other users that are potential contacts/ friends). Other ways of switching between different screens are also possible, e.g., different tabs, links, etc. Each of the contacts/friends listed in list 118 includes an icon of a telephone next to it. If the system receives input that the telephone icon has been selected, the system can automatically initiate a telephone call to that friend/contact. The call can be initiated within the app, without having to exit.

FIG. 16 shows an exemplary screenshot 124 of an add-friends screen. The add-friends screen includes a search field 126 and a list of suggested friends 128. The search field 126 allows a user to search for contacts/friends with whom to connect. One can search in the search field 126 by phone number, name, username, and/or other identifying information or words. The search may cause the system to automatically generate a list of potential matches that the user can browse. The list of potential matches from a search may be similar to the list of suggested friends 128.

The list of suggested friends 128 may include a list of potential contacts or friends that the user might be interested in connecting with. The system may automatically generate the list of suggested friends 128 based on various information or criteria. For example, the system may automatically generate the list of suggested friends 128 from connections the user's friends have that the user has not yet made. The system may also automatically search contact information in the phone or communication device and match that information to potential contacts/friends on the system. The list of suggested friends 128 includes an "add friend" button/ link 130 next to each of the potential contacts/friends in the list. If the system receives input that the "add friend" button/link 130 has been tapped or otherwise selected, the system may automatically generate and send a friend request to the potential friend/contact. The potential friend/contact may then choose to accept or decline the friend/connection request. Optionally, if the system receives input that the "add friend" button/link 130 has been tapped or otherwise selected, the system may automatically connect the user to the potential friend/contact. In one embodiment, "add friend" button/link 130" may be depicted as one or more plus signs. Optionally, the system may generate and/or display a new image in place of the pluses when they are selected, e.g., into a paper airplane or other object.

FIG. 17 shows an exemplary screenshot 134 of a friend requests screen. The friend requests screen includes a list of pending friend requests 136. An accept friend request button/link 138 is provided and is associated with a friend request. If the system receives input that the accept friend request button/link 138 has been tapped or otherwise selected, the system may automatically connect the friends/ users/contacts. In one embodiment, reject friend request button/link 138 may also be provided to allow a user to reject a friend request.

Figure 18:
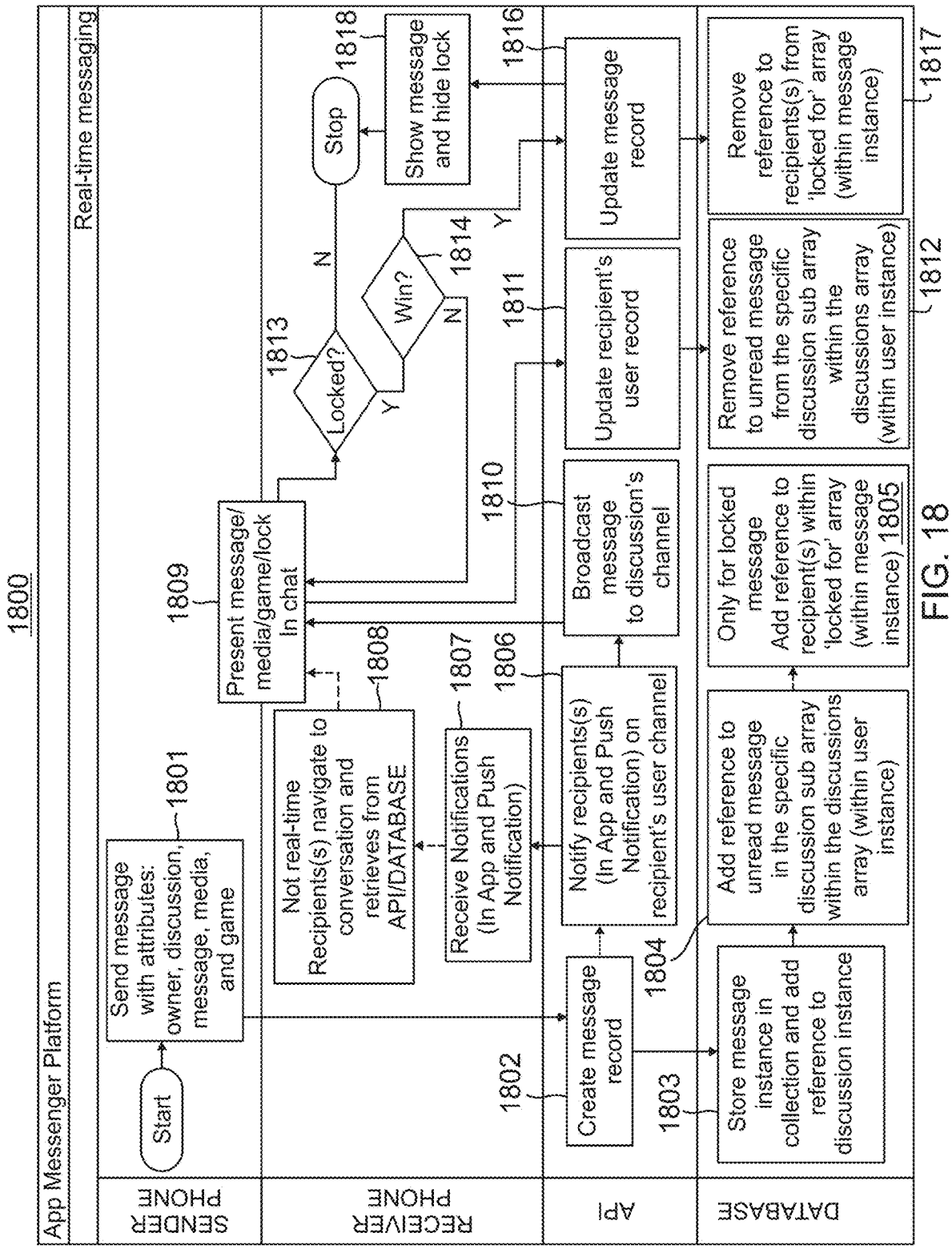
FIG. 18 shows an exemplary process diagram of how an exemplary system or platform may be configured and work.

FIG. 18 shows an exemplary process diagram of one way the system or platform may be configured and work Along the left side of FIG. 18 are listed: Sender Phone; Receiver Phone; API (Application Programming Interface), and Database. These may each be part of the system or platform and may generate or facilitate or include logic that generates or facilitates one or more aspects/functions associated with the system or platform. When functions are described in this application as being performed by the system, platform, phone, database, API, computing devices etc., the functions may be generated and/or performed by logic associated with the system, platform, phone, database, API, etc. The system may be JavaScript driven or use another language. The sender's phone (or other communication device) is where a message is initiated and starts (e.g., as discussed above relating to composition and sending of messages). In the method 1800, the sender's phone may receive input indicating that a message has been composed and/or entered and receive input indicating that the message should be sent. For example, step 1801 indicates that the system sends the message with its attributes, e.g., the owner (sender or recipient), discussion/conversation indicators, message content, media content (if any), game (if any), etc. The message may be any of the message types discussed above and may be entered as discussed above, e.g., into a conversation or message exchange as discussed and shown with respect to FIGS. 11-13. The sender's phone may signal the game as locked, locked for certain recipients, or lock or encrypt the message (e.g., with an electronic/video game) using software associated, with the app and the hardware of the phone or device.

If encrypted, the encryption may be generated on the sender's phone to ensure maximum security or may be generated by the API. The encryption may be done in a variety of ways. For example, encryption may be done using hashing and a salt. A salt is random data that is used as an additional input to a one-way function that hashes a password, passphrase, or other data. The salt may help defend against various attacks or attempts to reveal or hack the message. A new salt may be randomly generated on the sender's phone or at the API for each locked message. The salt and a password or other data may be concatenated and processed with a cryptographic hash function, and the resulting output stored with the salt in a database. Hashing allows for later authentication or unlocking while protecting the data in the event that the authentication data store is compromised. In one embodiment, proper authentication or unlocking is not possible until a game has been played and game objective achieved Completing the game objective may allow the system to generate and/or access the required information/data to decrypt and reveal the message.

The message may be routed/sent to the API where a message record is created at step 1802. The API may receive input or data from the sender's phone indicating that the message should be shown as locked until a game and/or certain criteria have been met, and this information or information that the message should be shown as locked may be included as part of the message record. If encryption is desired and the encryption did not take place at the sender's phone, the API can encrypt the message based on information/data received from the sender's phone.

At step 1803, the message and/or message record may be routed/sent to the database and stored as a message instance in a collection of messages in the database and reference may be added and/or included to a discussion instance (e.g., a particular conversation, discussion, or message exchange with a friend). At step 1804, in the database, reference to the message as an "unread message" may be added in a specific discussion sub array within a discussion array that is within a user instance. If the message is a locked message, then, at step 1805, the system may add reference to recipient(s) to "locked for" array (within message instance). In one embodiment, the message and/or message record may be stored in the database before sending the message or notification to the recipient. In one embodiment, the message database may be routed to and stored in the database concurrently with sending the message to the receiver. The messages may remain saved in the database or be deleted eventually (e.g., after some time period or after certain criteria have been met). Optionally, the database may only be used if the receiver's phone is not active or is otherwise able to receive the message, and the message may only be stored in the database until the message can be sent to the receiver's phone or other communication device. In one embodiment, once the message object has been delivered to the receiver's phone, the system may remove, from the database, a copy of the message within a specific discussion within recipient(s) discussions array (within user instance). Once a locked message is unlocked, the system may remove, from the database, recipient(s) from the "locked for" array (within message instance).

After the message record is created, the API may generate notification data to be sent to the phones or communication devices of the intended recipient(s) of the message and send/route the notification data to the receiver's phone or other communication device at step 1806. The notification data may indicate that the recipient has received a message. The API may generate and send data that causes the notifications to appear, and/or the receiver's phone receives data from the API and then generates and displays the notifications (e.g., a notification bubble that a new message has been received). The notification may be an in-app notification (e.g., if the app is open, notification of a new message will show in the app, for example, alert, notification bubble, or new activity indicator 64 and/or a notification 70). The notification may also be a push notification (e.g., if the app is closed, the notification may show up in the user's telephone notifications in a notification bar, home screen notice, notification menu, alert, etc.) Both in-app and push notifications may be generated, sent, and/or displayed by system logic. At steps 1807 and 1808, the receiver's phone may receive the in-app and/or push notification(s) data from the API and automatically generate and/or display an alert, new activity indicator, notification bubble, etc. in response to receiving the data generated and sent from the API. If the app is open on the receiver's phone, the notifications may be generated, displayed, and viewed in real-time in the app at step 1807. If the app is closed on the receiver's phone or otherwise not available, the system may still generate and display a push notification on the receiver's phone. If the notification is selected or tapped then or at a later time, the system may automatically open the app, retrieve the message from memory where it is stored in the database, and display the new message (e.g., at step 1809) and/or an in-app notification. Optionally, the system may receive input that the app itself has been selected, open the app, retrieve the message from memory where it is stored in the database, and display the new message (e.g., at step 1809) and/or an in-app notification. The system may require navigation to the conversation, then retrieve the message from the database and display it in the conversation (e.g., at step 1809).

At step 1810, the API may broadcast the message itself to both the sender and recipient(s), then the sender's phone or other communication device and the receiver's phone or other communication device, at step 1809, may display the message (e.g., text message, media, game, etc.) or display a locked message indicator (e.g., display as locked message 86 on the sender's phone and as locked message 88 on the receiver's phone, until the message is unlocked) in a conversation, e.g., as discussed above with respect to FIGS. 11-13. If the message is not locked, encrypted, or otherwise associated with data indicating it should display as locked, then both the sender's and the receiver's phones or communication devices will display the message as normal (e.g., similar to messages 80, 84, 82, and 90) without requiring further unlocking steps. Once the message is displayed to a reader, the receiver's phone can send data indicating that the message has been read to the API. Then at step 1811, the API can generate data telling the database to update the recipient's user record with respect to that message and send the data or instructions to the database. At step 1812, the database receives the data/instructions from the API to update the recipient's user record, and automatically removes reference to the message as an "unread message" from the specific discussion sub array within the discussions array (within the user instance).

If the message broadcast by the API to the phones or communication devices is associated with data indicating it should display as locked (e.g., a field indicating locked as true, or if the message data includes the receiver's phone or username in the "locked for" array associated with the message). For example, the message or message data may include or be associated with a "locked for" field or array that includes the phone numbers, user names, or other identifiers of the recipients for whom the message should appear as locked or similar to locked message 88. The sender will not generally be identified in the "locked for" array, so the message will show for the sender as a message sent as a locked message, but that is opened or unlocked (e.g., similar to locked message 86). This type of message (e.g., message 86) will be generated and displayed automatically on the sender's phone after the message has been sent and the API has broadcast the message to the sender's phone. If the receiver's phone is in the "locked for" array or otherwise receives the message with data indicating the message should display as locked, a locked message indicator similar to that shown in locked message 88 will be generated and shown instead of the content of the message. At step 1813, the receiver's phone will determine if the message is indicated as locked or if the receiver is in the "locked for" array. If the data indicates the message is locked and/or shows the message as locked, the system may require the recipient to play a game and complete and objective before the message is shown as unlocked. If the system receives input that a locked message indicator (e.g., as shown in locked message 88) is selected or tapped, then the system may automatically launch the game that the message is locked with and allow the recipient to play.

At step 1814, the system or receiver's phone determines whether the recipient successfully completed the game or game objective. If the system or receiver's phone determines that the recipient did not successfully complete the game or game objective, the message remains locked (e.g., the recipient is still identified in the "locked for" array) and the receiver's phone displays the locked indicator or message 88 again. If the system determines that the recipient successfully completed the game or game objective, the receiver's phone sends data to the API and, at step 1816, the API generates data/instructions telling the database to update the message record. At step 1817, the database receives the data/instructions from the API to update the message record and reference to the recipient or the identifier of the recipient in the "locked for" array may be removed from the "locked for" array within the message instance as stored in memory on the database. At step 1818, when the receiver is no longer indicated or referenced in the "locked for" array, the receiver's phone can automatically show the message (e.g., similar to locked message 89) and hides the lock indicator (e.g., similar to locked message 88). Optionally, if a "locked for" array is not used, other data that indicates the message should display as locked can be updated in memory on the database and the indicator that the message should display as locked can be changed so that the message no longer displays as locked. Other methods of unlocking a message are also possible. Generally, the system may accept an unlimited number of times attempting to open the message but, optionally, a limit could be imposed on the number of tries the system will accept before a message remains permanently locked or is deleted.

Optionally, if the broadcast and received message is encrypted, e.g., encrypted by the receiver's phone or communication device or API, the system must receive certain required input prior to unlocking (or decrypting) the message. For example, the required input may be input pertaining to a game that achieves a predefined score (e.g., reaches at least a predefined level within the game), as discussed above in more detail. The unlocked/decrypted message may be opened and displayed on the display of the receiver's phone or communication device as discussed above, e.g., with respect to FIGS. 12-13. When the system receives input other than the required input (e.g., the input does not result in a sufficient score or level within the game), a locked message indicator may again be generated and displayed on the display of the phone or communication device. The system may then wait for additional input that is equivalent to the required input.

The above systems, features, aspects, methods, etc. have generally been described with respect to an application on a communication device; however, the principles described may be applied to other types of devices, systems, methods, etc. Further, features described in one embodiment above, including embodiments described in the Summary section, may generally be combined with features described in other embodiments herein.

Components, aspects, features, etc. of the systems, devices, methods, etc. described herein may be implemented in hardware, software, or a combination of both. Where components, aspects, features, etc. of the systems, devices, methods, etc. described herein are implemented in software, the software may be stored in an executable format on one or more non-transitory machine-readable mediums. Further, the software and related steps of the methods described above may be implemented in software as a set of data and instructions. A machine-readable medium includes any mechanism that provides (e.g., stores and/or transports) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other forms of propagated signals (e.g., carrier waves, infrared signals, digital signals, EPROMs, EEPROMs, FLASH, magnetic or optical cards, or any type of media suitable for storing electronic instructions. Information representing the units, systems, and/or methods stored on the machine-readable medium may be used in the process of creating the units, systems, and/or methods described herein. Hardware used to implement the invention may include integrated circuits, microprocessors, FPGAs, digital signal controllers, stream processors, and/or other components.

While the invention has been described in terms of particular variations and illustrative figures, those of ordinary skill in the art will recognize that the invention is not limited to the variations or figures described. The features described with respect to one embodiment or variation may be used in other embodiments or variations. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A system comprising:
a server device including one or more processors, a non-transitory computer-readable storage medium and instructions stored thereon, the instructions being executable by the one or more processors to perform operations including:
    receiving input indicating that a first user has created an electronic communication and that the electronic communication is to be locked with a selected electronic game;
    responsive to receiving the input, generating a locked communication that includes the electronic communication and is locked based on the selected electronic game;
    transmitting the locked communication to a communication device of a second user, such that the second user must launch the selected electronic game on the communication device, play the electronic game on the communication device, and achieve a game objective within the selected electronic game on the communication device, before the locked communication is unlocked and the electronic communication is displayed on the communication device.

2. The system of claim 1, wherein the first user and the second user are participants in a communication application, wherein receiving input indicating that the first user has created the electronic communication and that the electronic communication is to be locked with the selected electronic game occurs in the communication application.

3. The system of claim 1, wherein the instructions, when executed by the one or more processors, perform operations further comprising:
responsive to receiving input that the game objective is a customized game objective identified by the first user via a user interface of an electronic device of the first user, generating the locked communication such that the electronic game must be played and the customized game objective achieved before the electronic communication can be displayed on the communication device.

4. The system of claim 1, wherein the instructions, when executed by the one or more processors, perform operations further comprising:
determining points earned by the second user based on input received as a result of certain predetermined activities performed by the second user in the selected electronic game on the communication device, wherein the game objective is to obtain a certain number of points, and the certain number of points must be obtained before the electronic communication is displayed on the communication device.

5. The system of claim 1, wherein the selected electronic game includes a character or avatar that can be controlled by the second user when playing the selected electronic game.

6. The system of claim 1, wherein the instructions, when executed by the one or more processors, perform operations further comprising:
providing, to an electronic device of the first user, one or more tools for generation, by the first user, of a customized game that may be used to generate the locked communication;
receiving a second input including the customized game, wherein the selected electronic game for the locked communication is the customized game.

7. The system of claim 6, wherein the instructions, when executed by the one or more processors, perform operations further comprising:
determining the second input includes information detailing the game objective, the game objective being a customized game objective identified by the first user via a user interface of an electronic device of the first user; and
generating the locked communication such that the electronic game must be played and the customized game objective achieved before the locked communication can be displayed on the communication device.

8. The system of claim 1, wherein the electronic communication is one or more of a text message, a media message, or a group message.

9. The system of claim 1 wherein the system receives the first input as a result of the first user activating a send button or send link via the electronic device.

10. The system of claim 1, wherein the instructions, when executed by the one or more processors, perform operations further comprising:
displaying a locked communication indicator on the communication device to indicate receipt of the locked communication to the second user.

11. The system of claim 10, wherein the instructions, when executed by the one or more processors, perform operations further comprising:
responsive to receiving third input from the communication device, the third input being that the locked communication indicator has been selected, launching the electronic game for playing on the communication device; and
responsive to receiving fourth input from the communication device, the fourth input being that the game objective has been achieved, displaying the electronic communication on the communication device.

12. The system of claim 1, wherein the selected electronic game is at least one of a classic video game remake, a puzzle, a trivia game, and a game with a quest, mission, or level.

13. The system of claim 1, wherein the instructions, when executed by the one or more processors, perform operations further comprising:
providing the first user with access to multiple different games as selectable options, such that the first user can select any of the multiple different games as the selected electronic game.

14. The system of claim 1, wherein generating the locked communication comprises encrypting the electronic communication using a hash and salt such that the electronic communication cannot be displayed on the communication device until the encryption is removed by playing the electronic game and achieving the game objective.

15. The system of claim 1, wherein the instructions, when executed by the one or more processors, perform operations further comprising:
gathering information regarding the second user and, based on the information, generating a personalized locked communication including a promotion or discount that may be accessed by the second user after unlocking the personalized locked communication, wherein the information includes information regarding the second user's location, and wherein generating the personalized locked communication includes generating the personalized locked communication to include a promotion or discount for use near the second user's location, wherein the promotion or discount may be accessed by the second user after unlocking the personalized locked communication.

16. A non-transitory storage medium having stored thereon instructions, the instructions being executable by one or more processors to perform operations including:
receiving a first input from a first computing device operating a communication application, the first input including data for an electronic communication and an indication the electronic communication is to be locked using an electronic game;
generating the electronic communication including the data received in the first input and locking the electronic communication using the electronic game to form a locked electronic communication; and
transmitting the locked electronic communication such that an indicator associated with the locked electronic communication is viewable in the communication application on a second computing device.

17. The storage medium of claim 16, wherein the instructions being executable by the one or more processors to perform operations further include:
receiving a second input from the second computing device, the second input including an indication that a required score or level of the electronic game was reached based on a third input received by the second computing device; and
responsive to the second input, displaying the electronic communication such that it is viewable in the communication application on the second computing device.

18. The storage medium of claim 16, wherein the instructions being executable by the one or more processors to perform operations further include:

displaying multiple different games as selectable options in the communication application on the first computing device, such that the indication the electronic communication is to be locked using the electronic game can be based on input indicating a user has selected one of the multiple different games as the electronic game.

19. A method comprising:

providing a system including logic and/or stored instructions executable by one or more processors to perform functions and operations;

acquiring a first set of data and/or parameters from a first user via a user interface of the system displayed on a screen or monitor, the first set of data and/or parameters including instructions to lock an electronic communication with an electronic game;

responsive to the first set of data and/or parameters, locking the electronic communication with the electronic game to generate a locked communication, such that the locked communication cannot be read by a second user until the second user completes an objective of the electronic game; and transmitting the locked communication such that an indicator of the locked communication is viewable on another screen or monitor;

responsive to receiving input that the indicator has been selected, launching the electronic game for playing.

20. The method of claim 19, further comprising providing multiple different game options, such that the first user can select the electronic game from the multiple different game options using the user interface.

* * * * *